United States Patent
Jalloul et al.

(10) Patent No.: US 9,973,225 B1
(45) Date of Patent: May 15, 2018

(54) RECEIVER PROVIDING REDUCED DISTORTION IN A WIRELESS DEVICE

(71) Applicant: QUALCOMM Incorporated, San Diego, CA (US)

(72) Inventors: Louay Jalloul, San Jose, CA (US); Ahmad Abdulrahman Mohammed, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/795,138

(22) Filed: Oct. 26, 2017

(51) Int. Cl.
*H03D 1/04* (2006.01)
*H04B 1/10* (2006.01)
*H04L 27/26* (2006.01)
*H04B 7/0413* (2017.01)
*H04L 25/02* (2006.01)

(52) U.S. Cl.
CPC ......... *H04B 1/1027* (2013.01); *H04B 7/0413* (2013.01); *H04L 25/0202* (2013.01); *H04L 27/2647* (2013.01)

(58) Field of Classification Search
CPC ............... H04L 5/0048; H04L 25/0226; H04L 25/0224; H04L 5/005; H04L 5/0051; H04L 27/261; H04L 27/2647; H04L 25/0202; H04B 7/0456; H04B 7/0639; H04B 7/0626; H04B 7/0413; H04B 7/0404; H04B 7/0452; H04B 7/0634; H04B 7/0632; H04B 2215/00; H04B 7/02; H04B 15/00; H04B 17/309; H04W 72/1226; H03B 1/1027
See application file for complete search history.

(56) References Cited

U.S. PATENT DOCUMENTS

| | | | |
|---|---|---|---|
| 9,806,776 B2 * | 10/2017 | Kwon | H04B 7/0456 |
| 2010/0002800 A1 * | 1/2010 | Kim | H04L 5/0037 375/295 |
| 2011/0135023 A1 * | 6/2011 | Kwon | H04L 25/0204 375/260 |
| 2011/0317748 A1 * | 12/2011 | Li | H04B 7/0417 375/219 |
| 2012/0113934 A1 * | 5/2012 | Ko | H04B 7/043 370/329 |
| 2015/0270917 A1 * | 9/2015 | Roman | H04J 11/005 370/329 |
| 2016/0072572 A1 * | 3/2016 | Kang | H04B 7/0417 370/329 |

* cited by examiner

*Primary Examiner* — Khanh C Tran
(74) *Attorney, Agent, or Firm* — Toler Law Group, PC.

(57) ABSTRACT

A device includes one or more antennas configured to receive a first signal and a second signal from a second device. The first signal includes a non-precoded signal. The device further includes a receiver coupled to the one or more antennas. The receiver is configured to determine a first channel estimate based on the first signal and determine a second channel estimate based on the second signal. The receiver is also configured to determine an estimated distortion based at least in part on the first channel estimate and the second channel estimate. The receiver is further configured to perform a distortion reduction operation on the second signal based on the estimated distortion to generate a reduced-distortion signal.

30 Claims, 7 Drawing Sheets

US 9,973,225 B1

RECEIVER PROVIDING REDUCED DISTORTION IN A WIRELESS DEVICE

I. FIELD

The present disclosure is generally related to reducing distortion at a receiver of a wireless device.

II. DESCRIPTION OF RELATED ART

Advances in technology have resulted in smaller and more powerful computing devices. For example, a variety of portable personal computing devices, including wireless telephones such as mobile and smart phones, tablets and laptop computers are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing and networking capabilities.

Increasing output power of a transmitter of a wireless device may increase the communication range of the wireless device. To increase the output power, the transmitter may be configured to reduce an input backoff (IBO), to provide an output signal to a power amplifier (PA) at a higher power level than is typical, or both. However, such configurations can cause the transmitter to clip the output signal, which may cause wide band distortion. For example, the clipping may be caused by heavy base band clipping or by PA non-linearity. Thus, even though the output signal is transmitted at a higher power level, distortion due to the clipping may appear at a receiver as elevated in-band noise. To reduce the distortion, the receiver may be configured to iteratively estimate the distortion and remove the estimated distortion from a received signal. The distortion may be estimated based on an estimation of symbol, such as a quadrature amplitude modulation (QAM) symbol, encoded in the received signal. If the distortion is sufficiently high, linear detectors within the receiver may be unable to estimate symbol with sufficient accuracy. Inaccurate symbol estimation may result in undecodable data or may cause an iterative distortion reduction process to be performed for many iterations, thereby increasing power consumption at the wireless device.

III. SUMMARY

In a particular aspect, a device includes one or more antennas configured to receive a first signal and a second signal from a second device. The first signal includes a non-precoded signal. The device further includes a receiver coupled to the one or more antennas. The receiver is configured to determine a first channel estimate based on the first signal and determine a second channel estimate based on the second signal. The receiver is also configured to determine an estimated distortion based at least in part on the first channel estimate and the second channel estimate. The receiver is further configured to perform a distortion reduction operation on the second signal based on the estimated distortion to generate a reduced-distortion signal.

In another particular aspect, a method of wireless communication includes receiving a first signal at a first device from a second device. The first signal includes a non-precoded signal. The method includes determining a first channel estimate based on the first signal. The method includes receiving a second signal at the first device from the second device. The second signal is received after receipt of the first signal. The method includes determining a second channel estimate based on the second signal. The method includes determining an estimated distortion based at least in part on the first channel estimate and the second channel estimate. The method further includes performing a distortion reduction operation on the second signal based on the estimated distortion to generate a reduced-distortion signal.

In another particular aspect, an apparatus includes means for receiving a first signal and a second signal from a second device. The first signal includes a non-precoded signal. The apparatus further includes means for reducing distortion of the second signal based on an estimated distortion. The estimated distortion is based at least in part on a first channel estimate and a second channel estimate, the first channel estimate based on the first signal, the second channel estimate based on the second signal.

In another particular aspect, a non-transitory computer readable medium stores instructions that, when executed by a processor, cause the processor to perform operations including initiating receipt of a first signal at a first device from a second device. The first signal includes a non-precoded signal. The operations include determining a first channel estimate based on the first signal. The operations include initiating receipt of a second signal at the first device from the second device, the second signal received after receipt of the first signal. The operations include determining a second channel estimate based on the second signal. The operations include determining an estimated distortion based at least in part on the first channel estimate and the second channel estimate. The operations further include initiating performance of a distortion reduction operation on the second signal based on the estimated distortion to generate a reduced-distortion signal.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
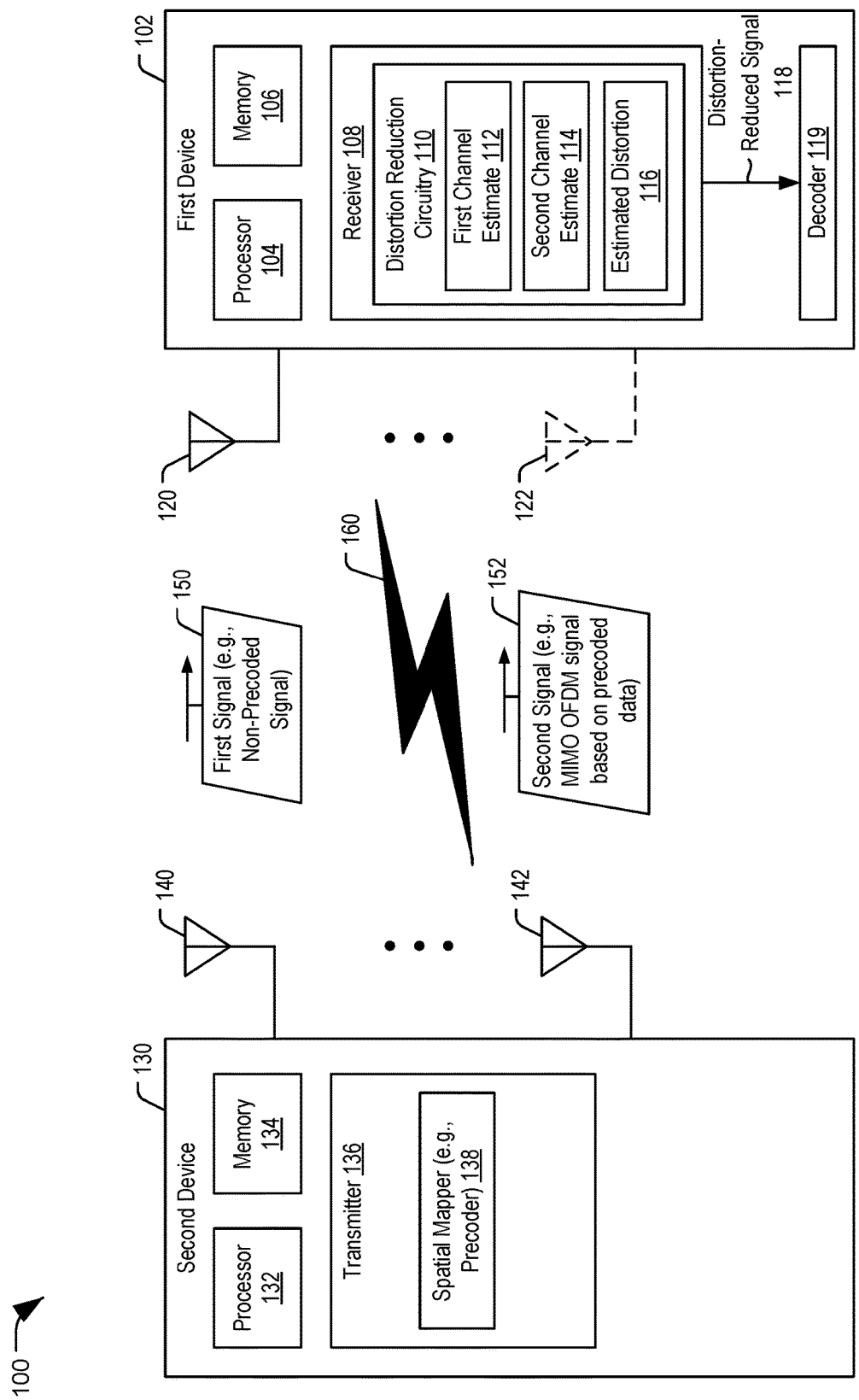
FIG. 1 is a block diagram of a particular illustrative aspect of a system that enables channel estimation and distortion reduction at a receiver.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "estimating", "shifting", "adjusting", etc. may be used to describe how one or more operations are performed. It should be noted that such terms are not to be construed as limiting and other techniques may be utilized to perform similar operations. Additionally, as referred to herein, "generating", "calculating", "estimating", "using", "selecting", "accessing", and "determining" may be used interchangeably. For example, "generating", "calculating", "estimating", or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

The present disclosure describes systems and methods for enabling improved channel estimation, symbol estimation, and distortion reduction at a receiver (or a transceiver) of a wireless device. For example, a receiver is configured to determine multiple channel estimates based on different signals, such as a known signal (or a null signal) as well as a data signal to be decoded, and the receiver is further configured to determine a distortion estimate (for use in a distortion reduction operation) based on the multiple channel estimates. To illustrate, a first device is configured to receive a first signal and a second signal from a second device. The first signal includes or corresponds to a non-precoded signal, such as a signal that is based on non-precoded data, and the second signal includes or corresponds to a precoded signal, such as a signal that is based on precoded (e.g., spatially mapped) data.

The first signal is sent from each transmit antenna (and corresponding transmit chain) of the first device. For example, the first device include T transmit antennas (and T transmit chains), where T is a positive integer. Each of the T transmit antennas (and T transmit chains) transmit at least a portion of the first signal. The receiver is configured to determine a first channel estimate based on the first signal and to determine a second channel estimate based on the second signal. Because the first signal is a non-precoded signal and is transmitted by each of the transmit antennas of the first device, the first channel estimate represents is independent of any spatial mapping/precoding. The receiver is further configured to modify the second channel estimate based on the first channel estimate, such as by applying a matrix that is based on the first channel estimate, as further described herein, to improve the second channel estimate prior to determining an estimated symbol based on the second channel estimate. As used herein, an estimated symbol is also referred to as a symbol estimate. The symbol estimate may include or correspond to a maximum likelihood (or near maximum likelihood) symbol estimate, a hard-decision symbol estimate, a soft-decision symbol estimate, etc., as further described herein.

After determining the symbol estimate, the receiver determines an estimated distortion based on the symbol estimate. The receiver is further configured to perform a distortion reduction operation based on the estimated distortion. For example, the estimated distortion may be subtracted from a received signal to generate a distortion-reduced signal. The distortion reduction operation may be performed as part of an iterative distortion reduction process performed on the received signal. Because the estimated distortion is based on the second channel estimate and the first channel estimate (which is based on a non-precoded signal from each of the antennas/transmit chains of the first device), the estimated distortion may more accurately represent distortion of the received signal than estimated distortion determined by other receivers, such as by using linear detectors that do not determine a channel estimate based on a non-precoded signal. Increasing the accuracy of the estimated distortion may result in a distortion-reduced signal having higher quality, a reduction in power consumption of a wireless device (due to fewer iterations of the iterative distortion reduction process), or both.

Referring to FIG. 1, a particular illustrative example of a system is shown and generally designated 100. The system 100 enables channel estimation and distortion reduction at a receiver, as further described herein. The system 100 includes a first device 102 communicatively coupled, via a communication channel 160, to a second device 130. The communication channel 160 includes or corresponds to any medium via which the first device 102 and the second device 130 may share wireless communications, such as an air interface, as a non-limiting example. In a particular implementation, the first device 102, the second device 130, or both, include a mobile device, such as a mobile phone, a laptop computer, a tablet computer, etc. Additionally, or alternatively, the first device 102, the second device 130, or both, may include a base station, an access point, a station, an eNodeB, or another type of device.

The first device 102 is configured to perform wireless communications with the second device 130 via the communication channel 160. The wireless communications may be performed in accordance with one or more industry standards, such as an Institute of Electrical and Electronics Engineers (IEEE) standard, a Wi-Fi Alliance standard, or another industry standard. In a particular implementation, the wireless communications are performed in accordance with the IEEE 802.11ax standard.

The first device 102 includes a processor 104, a memory 106, a receiver 108, a decoder 119, and one or more receive antennas. The processor 104 is coupled to the memory 106 and the receiver 108. In some implementations, the first device 102 further includes a transmitter. In some implementations, the receiver 108 (and the transmitter) are included in a transceiver. The processor 104 is configured to execute instructions stored at the memory 106 to perform operations described herein. For example, the memory 106 may include or correspond to a non-transitory, computer readable medium storing instructions that, when executed by the processor 104, cause the processor 104 to perform operations described herein.

The receiver 108 is coupled to the one or more receive antennas. In a particular implementation, the first device 102 includes R receive antennas, where R is any positive integer. For example, the first device 102 may include a first receive antenna 120 and an optional Rth receive antenna 122. In other implementations, the first device 102 may include more than two receive antennas or a single receive antenna. In a particular implementation, the receiver 108 includes R receive chains, such that each receive chain is coupled to, and configured to process signals received by, a corresponding receive antenna of the one or more antennas. For example, the receiver 108 may include a first receive chain configured to process signals received by the first receive antenna 120. The receiver 108 may optionally include a Rth receive chain configured to process signals received by the Rth receive antenna 122.

The receiver 108 also includes distortion reduction circuitry 110. The distortion reduction circuitry 110 is configured to perform a distortion reduction operation on a received signal based on estimated distortion to generate a distortion-reduced signal 118. The estimated distortion is determined based on multiple channel estimates, as further described herein. In a particular implementation, the distortion reduction operation is part of an iterative distortion reduction process. The receiver 108 is configured to provide the distortion-reduced signal 118 to the decoder 119. The decoder 119 is configured to decode the distortion-reduced signal 118 to generate decoded data, which may be processed by the processor 104. Although the decoder 119 is illustrated as being external to the receiver 108, in other implementations, the decoder 119 is included in the receiver 108.

The second device 130 includes a processor 132, a memory 134, a transmitter 136, and a plurality of transmit antennas. In some implementations, the second device 130 further includes a receiver. In some implementations, the transmitter 136 (and the receiver) are included in a transceiver. The processor 132 may be configured to execute instructions stored at the memory 134 to perform operations described herein.

The transmitter 136 is coupled to the plurality of transmit antennas. In a particular implementation, the second device 130 includes T transmit antennas, where T is any positive integer greater than one. For example, the second device 130 may include a first transmit antenna 140 and a Tth transmit antenna 142. In other implementations, the second device 130 includes more than two transmit antennas. In a particular implementation, the transmitter 136 includes T transmit chains, such that each transmit chain is coupled to, and configured to process signals to be sent by, a corresponding transmit antenna of the plurality of transmit antennas. For example, the transmitter 136 may include a first transmit chain configured to process signals to be sent (e.g., wirelessly transmitted) by the first transmit antenna 140 and a Tth transmit chain configured to process signals to be sent by the Tth transmit antenna 142. The transmitter 136 also includes a spatial mapper 138 (e.g., a precoder). The spatial mapper 138 may include circuitry or other components configured to apply spatial mappings to data prior to transmission of the data via one or more of the antennas 140-142. As used herein, applying spatial mappings to data is also referred to as precoding the data, and spatially-mapped data is also referred to as precoded data. Data may be precoded (or spatially mapped) to enable transmission of a multiple-input, multiple-output (MIMO) orthogonal frequency-division multiplexing (OFDM) signal. For example, the transmitter 136 may be configured to transmit different precoded data from the T transmit antennas of the second device 130 via different spatial streams.

During operation, the second device 130 may determine that there is data to be transmitted to the first device 102 via the communication channel 160. Prior to transmitting the data, the second device 130 may transmit a first signal 150 to the first device 102. In a particular implementation, the second device 130 sends the first signal 150 in response to determining that there is data to send to the first device 102. Alternatively, the second device 130 may receive a request from the first device 102 and, responsive to receiving the request, transmit the first signal 150 to the first device 102. The request may be sent as part of an association or other initiation process to enable wireless data communications between the first device 102 and the second device 130.

The first signal 150 includes or corresponds to a non-precoded signal. For example, the spatial mapper 138 may refrain from applying spatial mapping (e.g., precoding) the first signal 150. In a particular implementation, the first signal 150 includes (or is based on) one or more null data packets (NDPs). In a particular implementation, the first signal 150 includes (or is based on) a pilot sequence, such as a sequence of pilot signals. The pilot sequence may be identifiable to the first device 102. For example, the first device 102 and the second device 130 may each store data indicative of the pilot sequence. The data may be stored at the first device 102 and the second device 130 during manufacture, during set-up, during update(s), or at other times.

The first device 102 receives the first signal 150 at the one or more receive antennas. For example, the first signal 150 may be received at the first receive antenna 120 (in implementations that include a single antenna). As another example, a portion of the first signal 150 may be received at the first receive antenna 120 and a Rth portion of the first signal 150 may be received at the Rth receive antenna 122 (in implementations that include multiple antennas). The one or more receive antennas of the first device 102 may receive at least a portion of the first signal 150 from each of multiple transmit antennas of the second device 130. For example, each transmit antenna (and transmit chain) of the second device 130 may transmit a respective portion of the first signal 150 to the first device 102, and each receive antenna (and receive chain) of the first device 102 may receive each of the portions of the first signal 150. The number of portions of the first signal 150 may be equal to T/R, and each portion of the first signal 150 may be sent from R transmit antennas (and transmit chains). For example, if the first device 102 includes two receive antennas and the second device 130 includes six transmit antennas, the first signal 150 may be sent as three portions, where each portion is sent from two transmit antennas (and two transmit chains), as further described with reference to FIG. 2. Thus, the first signal 150 includes a transmission from all transmit antennas (and transmit chains) of the second device 130.

The first device 102 determines a first channel estimate 112 based on the first signal 150. For example, the distortion reduction circuitry 110 may determine the first channel estimate based on the first signal 150. The first channel estimate 112 may include or correspond to a channel matrix (or other channel information) that represents modifications to signals caused by the communication channel 160. Because at least a portion of the first signal 150 is transmitted by each of the transmit antennas (and transmit chains) of the second device 130, and the first signal 150 is received at the one or more receive antennas (and receive chains) of the first device 102, the first channel estimate 112 also represents modifications caused by the multiple transmit antennas and the transmitter 136 (e.g., the multiple transmit chains) of the second device 130 and the one or more receive antennas and the receiver 108 (e.g., the one or more receive chains) of the first device 102. However, because the first signal 150 is a non-precoded signal, the first channel estimate 112 does not represent modifications caused by the spatial mapping/precoding applied by the spatial mapper 138. In a particular implementation, the first device 102 may determine a sub-channel estimate based on each portion of the first signal 150, and the first channel estimate 112 may be determined based on the sub-channel estimates, as further described with reference to FIG. 2.

In a particular implementation, the first channel estimate 112 is determined at a particular tone according to Equation 1 as follows:

$$y = HPs + Hd + n \quad \text{(Eq. 1)}$$

where y is a received $N_r \times 1$ vector (as used herein, $N_r$ is equal to R), H is the $N_r \times N_t$ raw channel matrix (as used herein, $N_t$ is equal to T), P is the spatial mapping (precoding) $N_t \times N_{ss}$ matrix applied at the transmitter 136 by the spatial mapper 138, $N_{ss}$ is the number of spatial streams used to transmit the first signal 150, s is the transmitted $N_{ss} \times 1$ M-quadrature amplitude (QAM) symbol vector, M is the QAM constellation size, d is the generated $N_t \times 1$ distortion vector (composite of all transmitted symbols), and n is the thermal noise $N_r \times 1$ vector. The thermal noise vector n is zero-mean complex Gaussian circularly symmetric with $E[nn^*] = \sigma^2 I_{N_r}$. In Equation 1, the channel matrix H represents the receive paths in addition to the communication channel 160.

It is noted that the $N_R \times N_T$ raw channel matrix H is not available using typical channel estimation procedures, such as procedures that use a long-training field (LTF). Additionally, knowledge of the spatial mapping matrix P may not be sufficient to determine the channel matrix H because the spatial mapping matrix P may not be a square matrix. However, the first device 102, using the distortion reduction circuitry 110, is able to determine the first channel estimate 112 (including or corresponding to the channel matrix H) based on a non-precoded signal, such as the first signal 150. Determining the first channel estimate 112 is further described with reference to FIG. 2. In this manner, the receiver 108 is able to estimate the channel matrix H independent of the spatial mapping matrix P, and the channel matrix H that is estimated may be used to refine a received precoded signal and a channel estimate based on the received precoded signal, as further described herein.

After transmitting the first signal 150, the second device 130 generates a second signal 152 based on precoded data. For example, the second device 130 may provide, to the spatial mapper 138, data that is to be sent to the first device 102. The spatial mapper 138 may spatially map/precode the data to generate multiple spatial streams for transmission to the first device 102. The second device 130 may send the multiple spatial streams to the first device 102 as the second signal 152. For example, the second signal 152 may include or correspond to a MIMO-OFDM signal that is sent via at least two of the transmit antennas of the second device 130 to the first device 102. For example, the second device 130 may send the second signal 152 via the first transmit antenna 140 and the Tth transmit antenna 142, such that all of the transmit antennas (and transmit chains) of the second device 130 are used to send the second signal 152. Alternatively, the second device 130 may send the second signal 152 via a subset of the transmit antennas (and transmit chains).

The first device 102 receives the second signal 152 via the communication channel 160 and the one or more receive antennas (and the one or more receive chains). The first device 102 determines a second channel estimate 114 based on the second signal 152. For example, the distortion reduction circuitry 110 may determine the second channel estimate 114 using one or more channel estimation techniques. In a particular implementation, the second channel estimate 114 may correspond to HP (the channel matrix H multiplied by the spatial mapping matrix P), as described with reference to Equation 1.

The first device 102 determines an estimated distortion 116 based at least in part on the first channel estimate 112 and the second channel estimate 114. For example, the distortion reduction circuitry 110 may perform conditioning on the second channel estimate 114 and the second signal 152 based on the first channel estimate 112. In a particular implementation, the conditioning includes generating pre-whitening values, such as a pre-whitening matrix, based on the first channel estimate 112. The conditioning also includes modifying the second channel estimate 114 and the second signal 152 based on the pre-whitening values. In other implementations, the conditioning includes generating an inverse matrix based on the first channel estimate 112 and modifying the second channel estimate 114 and the second signal 152 based on the inverse matrix. Performing the conditioning is further described with reference to FIG. 3.

The first device 102 determines a symbol estimate based on the second signal 152 and the second channel estimate 114, and the estimated distortion 116 may be based on the symbol estimate. For example, after performing the conditioning on the second signal 152 and the second channel estimate 114, the distortion reduction circuitry 110 may determine the symbol estimate based on the second signal 152 and the second channel estimate 114. The symbol estimate may be a maximum likelihood (ML) estimate or a near maximum likelihood estimate. In a particular implementation, the symbol estimate includes or corresponds to a hard-decision symbol estimate. Alternatively, the symbol estimate may include or correspond to a soft-decision symbol estimate. Determining the symbol estimate, and performing additional processing to determine the estimated distortion 116 based on the symbol estimate, is further described with reference to FIGS. 3-5.

After determining the estimated distortion 116, the first device 102 performs a distortion reduction operation on the second signal 152 based on the estimated distortion 116 to generate the distortion-reduced signal 118. For example, the distortion reduction circuitry 110 may subtract the estimated distortion 116 from the second signal 152 to generate the distortion-reduced signal 118. In a particular implementation, the estimated distortion 116 may be converted to the frequency domain and multiplied by the second channel estimate 114 prior to being subtracted from the second signal 152, as further described with reference to FIG. 3. Performing the distortion reduction operation, such as by subtracting the estimated distortion 116 (or a value based on the estimated distortion 116) from the second signal 152, may reduce (or eliminate) distortion in the distortion-reduced signal 118. In some implementations, the distortion reduction operation may be performed as part of an iterative distortion reduction process. For example, the distortion-reduced signal 118 may be processed in a similar manner to the second signal 152 to determine a second estimated distortion, and a second distortion reduction operation may be performed on the distortion-reduced signal 118 to further reduce (or eliminate) distortion of the distortion-reduced signal 118. In this manner, performing multiple iterations may further refine the distortion-reduced signal 118 to a target level, such as a level that is sufficient for decoding.

After generation of the distortion-reduced signal 118, the distortion-reduced signal 118 is provided to the decoder 119 for decoding. The decoder 119 initiates a decoding operation on the distortion-reduced signal 118 to generate received data that corresponds to the data sent by the second device 130 via the second signal 152. The decoder 119 may include an interleaver decoder, a different MIMO-OFDM decoder type, a different type of decoder, or a combination thereof. Because the distortion-reduced signal 118 is decoded, the received data may be more accurate or generated more quickly than if the second signal 152 is decoded.

Thus, the system 100 of FIG. 1 enables improved distortion reduction as compared to other receivers. For example, because the estimated distortion 116 is determined based on the second channel estimate 114 and the first channel estimate 112, the estimated distortion 116 may more accurately represent distortion associated with the second signal 152. Additionally, or alternatively, the distortion-reduced signal 118 may be generated using fewer iterations of an iterative distortion reduction process as compared to other receivers, which reduces power consumption at the first device 102. Because the receiver 108 is capable of reducing more distortion than other receivers, the second device 130 may be configured to reduce an IBO of the transmitter 136 or otherwise increase the output power of the transmitter 136, and the increased distortion caused by clipping that may result from the increased output power of the transmitter 136 may be compensated for by the improved distortion reduction of the receiver 108. Thus, wireless signals may be transmitted across further distances without significantly degrading the accuracy of decoded data, or significantly increasing power consumption, at a receiving device.

Figure 2:
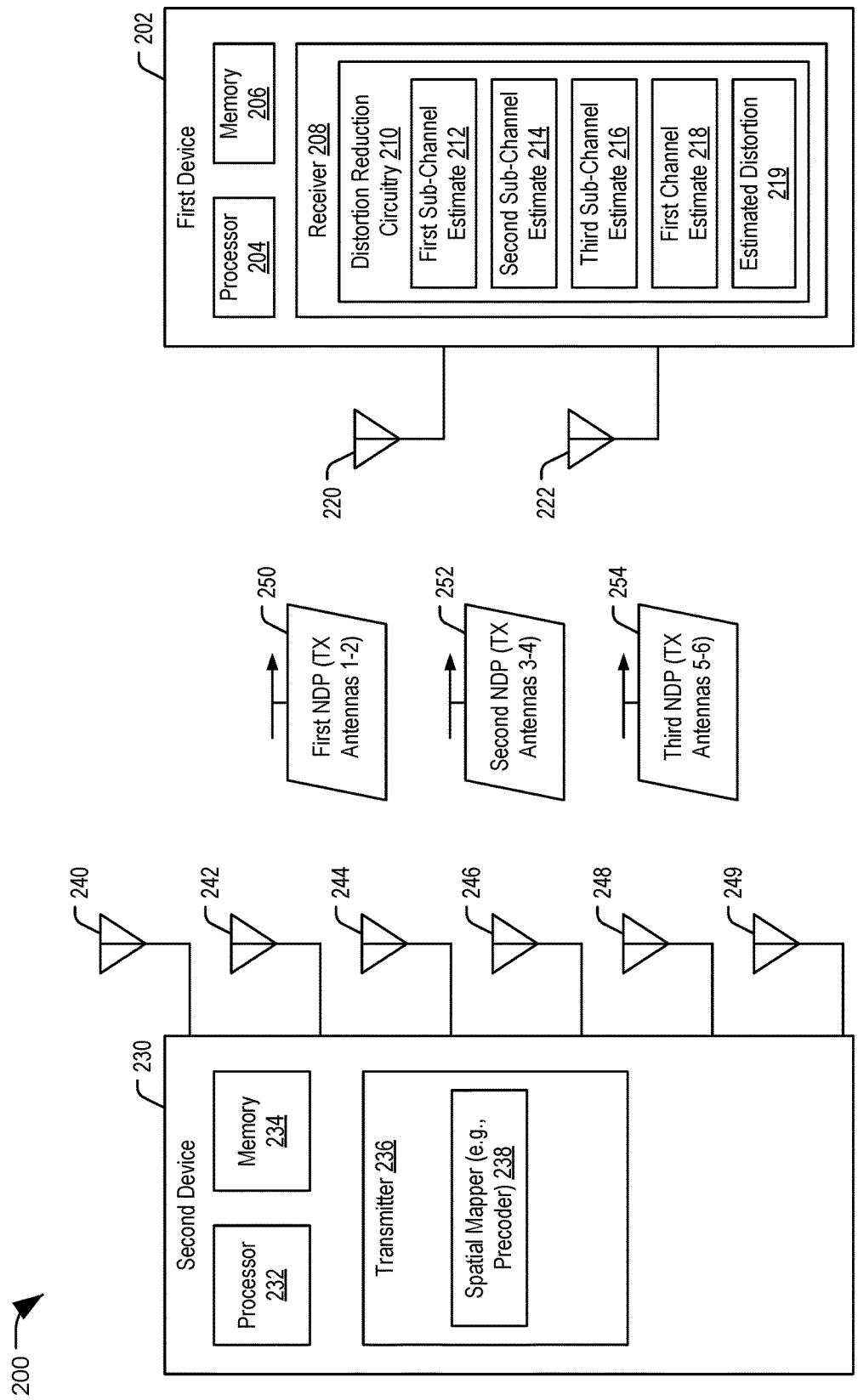
FIG. 2 is a block diagram of a particular illustrative aspect of a system that enables channel estimation at a receiver based on null data packets.

Referring to FIG. 2, a particular illustrative example of a system is shown and generally designated 200. The system 200 enables channel estimation at a receiver based on null data packets, as further described herein. In a particular implementation, the system 200 may include or correspond to the system 100 of FIG. 1.

The system 200 includes a first device 202 and a second device 230. The first device 202 includes a processor 204, a memory 206, and a receiver 208. The receiver 208 includes distortion reduction circuitry 210. The second device 230 includes a processor 232, a memory 234, and a transmitter 236. The transmitter 236 includes a spatial mapper 238. In some implementations, the first device 202 and the second device 230 include or correspond to the first device 102 and the second device 130 of FIG. 1, respectively. For example, the processor 204, the memory 206, the receiver 208, the distortion reduction circuitry 210, the processor 232, the memory 234, the transmitter 236, and the spatial mapper 238 may include or correspond to the processor 104, the memory 106, the receiver 108, the distortion reduction circuitry 110, the processor 132, the memory 134, the transmitter 136, and the spatial mapper 138 of FIG. 1, respectively.

In the particular implementation illustrated in FIG. 2, the first device 202 includes a first plurality of receive antennas and the second device 230 includes a second plurality of transmit antennas. The first plurality of receive antennas includes a first antenna 220 and a second antenna 222. The second plurality of transmit antennas includes a first antenna 240, a second antenna 242, a third antenna 244, a fourth antenna 246, a fifth antenna 248, and a sixth antenna 249. The receiver 208 may include two receive chains that correspond to the antennas 220-222, and the transmitter 236 may include six transmit chains that correspond to the antennas 240-249. In other implementations, the first device 202 may include more than two or fewer than two receive antennas (and receive chains), the second device 230 may include more than six or fewer than six transmit antennas (and receive chains), or a combination thereof.

As described with reference to FIG. 1, the second device 230 is configured to transmit a first signal to the first device 202 prior to transmitting a second signal to the first device 202. The first signal includes or corresponds to a non-precoded signal, and the second signal includes or corresponds to a precoded signal, such as a MIMO-OFDM signal. In the particular implementation illustrated in FIG. 2, the first signal includes (or is based on) a plurality of null data packets (NDPs) that are transmitted from a subset of the antennas 240-249.

To illustrate, in response to determining that the second device 230 has data to be transmitted to the first device 202 (or in response to receiving a request from the first device 202), the second device 230 may generate a plurality of NDPs for transmission to the first device 202. Because the plurality of NDPs are to represent the communication channel between the transmitter 236 and the receiver 208 without spatial mapping, the second device 230 disables the spatial mapper 238 to prevent the plurality of NDPs from being precoded prior to transmission.

The second device 230 may determine a number of NDPs to generate and transmit based on a number of transmit antennas (T) of the second device 230 and a number of receive antennas (R) of the first device, where R and T are positive integers. In a particular implementation, the number of NDPs is equal to T/R. In a particular implementation illustrated in FIG. 2, the second device 230 generates 6/2=3 NDPs. To illustrate, the second device 230 may generate and transmit a first NDP 250, a second NDP 252, and a third NDP 254. In a particular implementation, the NDPs 250-254 correspond to the first signal 150 of FIG. 1.

Each NDP may be transmitted via R antennas (and R transmit chains). For example, the first NDP 250 may be transmitted via the first antenna 240 and the second antenna 242 (and the first and second transmit chains), the second NDP 252 may be transmitted via the third antenna 244 and the fourth antenna 246 (and the third and fourth transmit chains), and the third NDP 254 may be transmitted via the fifth antenna 248 and the sixth antenna 249 (and the fifth and sixth transmit chains). Thus, each NDP may be transmitted by the same number of antennas (and transmit chains) as the number of antennas (and receive chains) that will be used to receive the NDP at the first device 202.

The first device 202 receives the NDPs 250-254 via the first antenna 220 and the second antenna 222 (and the first and second receive chains). The first device 202 determines sub-channel estimates based on the NDPs 250-254. For example, the distortion reduction circuitry 210 may determine a first sub-channel estimate 212 based on the first NDP 250, a second sub-channel estimate 214 based on the second NDP 252, and a third sub-channel estimate 216 based on the third NDP 254. In a particular implementation, each sub-channel estimate includes a R×R sub-channel matrix. For example, in FIG. 2, each of the sub-channel estimates 212-216 include a 2×2 matrix. The first device 202 may generate a first channel estimate 218 based on the sub-channel estimates 212-216. For example, the distortion reduction circuitry 210 may combine the first sub-channel estimate 212, the second sub-channel estimate 214, and the third sub-channel estimate 216 to generate the first channel estimate 218.

For example, $H=[H_1 \ldots H_{T/R}]$. To illustrate, the three 2×2 sub-channel matrices (the sub-channel estimates 212-216) may be combined to generate a 6×2 channel matrix (the first channel estimate 218). In other implementations, the sub-channel matrices and the channel matrix may have different sizes, and a different number of NDPs may be transmitted by the second device 230.

The first device 102 determines an estimated distortion 219 based at least in part on the first channel estimate 218. For example, the distortion reduction circuitry 210 may determine the estimated distortion 219 based on the first channel estimate 218, a precoded signal received from the second device 230, and a second channel estimate (based on the precoded signal), as described with reference to FIG. 1. In a particular implementation, the first channel estimate 218 and the estimated distortion 219 may include or correspond to the first channel estimate 112 and the estimated distortion 116 of FIG. 1, respectively. In some implementations, the distortion reduction circuitry 210 may modify the second channel estimate and the received precoded signal based on the first channel estimate 218, as further described with reference to FIG. 3.

The distortion reduction circuitry 210 performs a distortion reduction operation on the received precoded signal based on the estimated distortion 219 to reduce (or eliminate) distortion associated with the received precoded signal. Because the estimated distortion 219 is based at least in part on the first channel estimate 218, the distortion reduction operation may reduce more distortion, or may be performed in fewer iterations, as compared to other receivers that use linear detectors to reduce distortion. Thus, by transmitting the NDPs 250-254, the system 200 improves the distortion reduction capabilities of the receiver 208, which may result in more accurate decoding of transmitted data, reduced power consumption at the first device 202, ability to increase the output power of the transmitter 236 (without concern for signal clipping), or a combination thereof. In other implementations, other non-precoded signals may be used instead of the NDPs 250-254. For example, a pilot sequence that is not precoded may transmitted by the second device 230 to the first device 202 to enable determination of sub-channel estimates at the first device 202.

Figure 3:
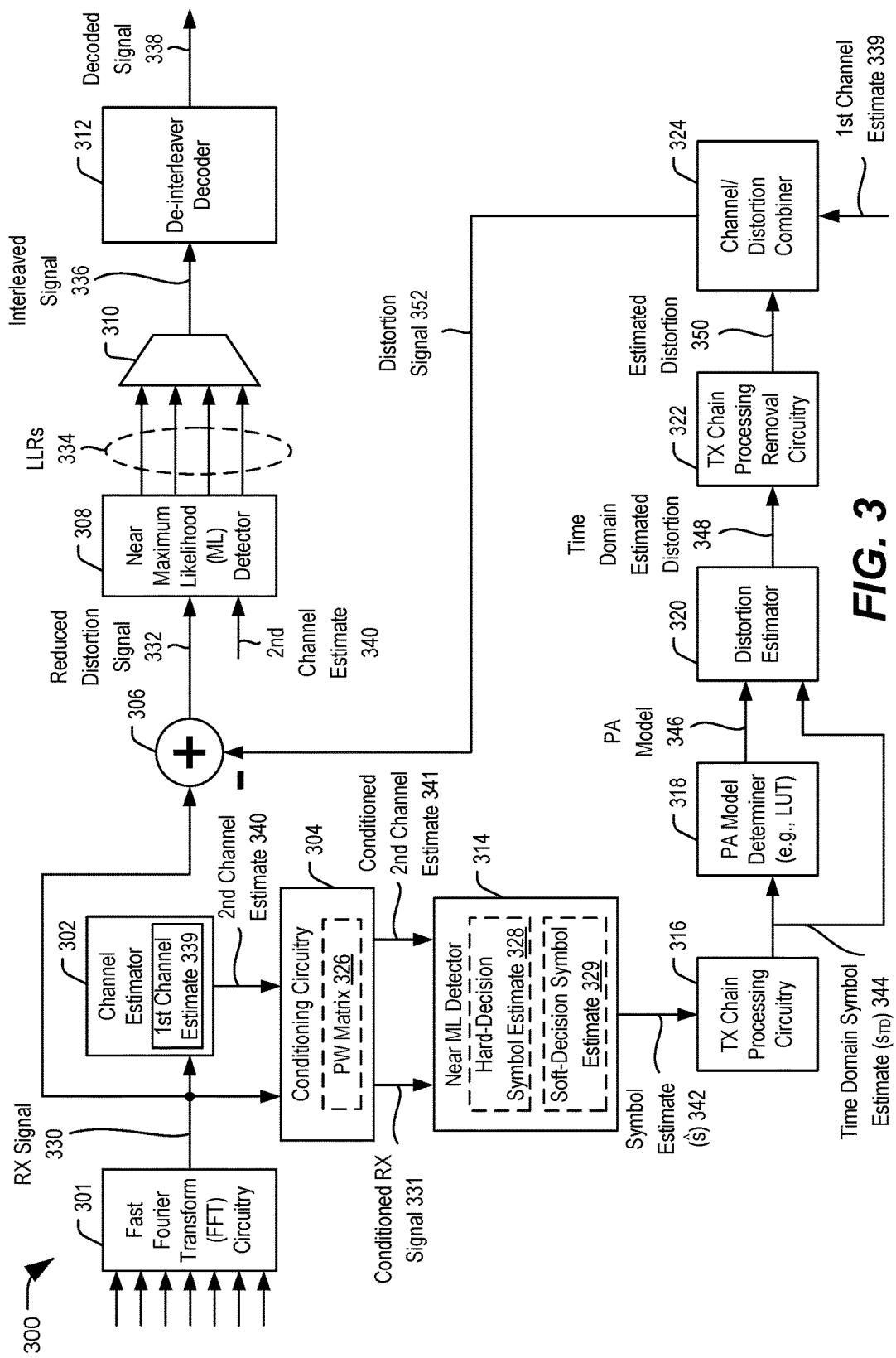
FIG. 3 is a block diagram of a particular illustrative aspect of a receiver configured to perform a distortion reduction operation on a received signal.

Referring to FIG. 3, a particular illustrative example of a receiver configured to perform a distortion reduction operation on a received signal is shown and generally designated 300. In some implementations, the receiver 300 includes or corresponds to the receiver 108 of FIG. 1 or the receiver 208 of FIG. 2.

The receiver 300 includes a fast Fourier transform (FFT) circuitry 301, a channel estimator 302, conditioning circuitry 304, a combiner 306, a near ML detector 308, a multiplexer 310, a de-interleaver decoder 312, a near ML detector 314, transmit (TX) chain processing circuitry 316, a power amplifier (PA) model determiner 318, a distortion estimator 320, TX chain processing removal circuitry 322, and a channel/distortion combiner 324. The FFT circuitry 301 is coupled to the channel estimator 302, the conditioning circuitry 304, and the combiner 306. The channel estimator 302 is coupled to the conditioning circuitry 304 (and in some implementations to the channel/distortion combiner 324 and the near ML detector 308). The near ML detector 314 is coupled to the TX chain processing circuitry 316. The TX chain processing circuitry 316 is coupled to the PA model determiner 318 and the distortion estimator 320. The distortion estimator 320 is coupled to the TX chain processing removal circuitry 322. The TX chain processing removal circuitry 322 is coupled to the channel/distortion combiner 324. The channel/distortion combiner 324 is coupled to the combiner 306. The combiner 306 is coupled to the near ML detector 308. The near ML detector 308 may be coupled to the multiplexer 310. The multiplexer 310 is coupled to the de-interleaver decoder 312.

The FFT circuitry 301 is configured to receive one or more spatial streams transmitted by another device (such as the second device 130 of FIG. 1 or the second device 230 of FIG. 2) and to perform FFT operations to generate a received signal 330 ("RX Signal"). For example, the FFT circuitry 301 may generate the received signal 330 by performing one or more FFT operations on multiple spatial streams received at the receiver 300. The multiple spatial streams may correspond to a MIMO-OFDM signal that is transmitted by another device. In a particular implementation, the multiple spatial streams include or correspond to the second signal 152 of FIG. 1. After performance of the FFT operations, the received signal 330 is in the frequency domain. The FFT circuitry 301 provides the received signal 330 to the channel estimator 302, the combiner 306, and the conditioning circuitry 304.

The channel estimator 302 is configured to determine a second channel estimate 340 based on the received signal 330. The second channel estimate 340 may represent a model of a communication path between a device that includes the receiver 300 and another device that takes into account precoding performed at other device. For example, the second channel estimate 340 may correspond to HP in Equation 1. In a particular implementation, the second channel estimate 340 includes or corresponds to the second channel estimate 114 of FIG. 1. After determining the second channel estimate 340, the channel estimator 302 provides the second channel estimate 340 to the conditioning circuitry 304 and the near ML detector 308. Additionally, or alternatively, the channel estimator 302 may be configured to generate a first channel estimate 339 based on a non-precoded signal received at the receiver 300. The first channel estimate 339 may include or correspond to the first channel estimate 112 of FIG. 1 or the first channel estimate 218 of FIG. 2. The first channel estimate 339 is provided to, or used to determine value(s) that are provided to, conditioning circuitry 304, as further described herein. Additionally, or alternatively, the first channel estimate 339 is provided to the channel/distortion combiner 324.

The conditioning circuitry 304 is configured to perform conditioning on the received signal 330 and the second channel estimate 340 to generate a conditioned received signal 331 ("Conditioned RX Signal") and a conditioned second channel estimate 341, respectively. The conditioning is based on the first channel estimate 339.

In a particular implementation, the conditioning circuitry 304 is configured to perform the conditioning by modifying the received signal 330 and the second channel estimate 340 based on pre-whitening values. The pre-whitening values may be based on the first channel estimate 339. In some implementations, the pre-whitening values include or correspond to a pre-whitening matrix 326. In such implementations, the conditioning circuitry 304 is configured to apply the pre-whitening matrix 326 to the received signal 330 and the second channel estimate 340 to generate the conditioned received signal 331 and the conditioned second channel estimate 341. Although described as being determined by the conditioning circuitry 304, in other implementations, other component(s) of the receiver 300 may determine and provide the pre-whitening matrix 326 to the conditioning circuitry 304, and the conditioning circuitry 304 may apply, such as via multiplication, the pre-whitening matrix 326 to the received signal 330 and the second channel estimate 340. Although described as a pre-whitening matrix, in other implementations, other types of pre-whitening values may be used.

In a particular implementation, the conditioning circuitry 304 is configured to determine the first channel estimate 339 based on the non-precoded signal and to determine a thermal noise variance based on the non-precoded signal. The conditioning circuitry 304 is also configured to determine a distortion and noise covariance matrix based on the first channel estimate 339 and the thermal noise variance. The conditioning circuitry 304 is further configured to determine the pre-whitening matrix 326 based on the distortion and noise covariance matrix. In a particular implementation, a probability density function of a received vector y (corresponding to the received signal 330) given a transmitted symbol s is given by Equation 2 as follows:

$$p(y|s) \propto \exp\{(y-HPs)^* C^{-1}(y-HPs)\} = \exp\{\|C^{-1/2}y - C^{-1/2}HPs\|^2\} \quad \text{(Eq. 2)}$$

where exp is an exponent operation, H is the channel matrix (corresponding to the first channel estimate 339), P is the spatial mapping matrix, and C is a distortion and noise covariance matrix.

The distortion and noise covariance matrix C may be based on the first channel estimate 339 and a thermal noise variance. In a particular implementation, the distortion and noise covariance matrix C is determined based on Equation 3 as follows:

$$C = HH^* \sigma^{-2} I_{N_r} \quad \text{(Eq. 3)}$$

where $HH^*$ represents the distortion variance and $\sigma^2 I_{N_r}$ represents the thermal noise variance (also referred to as the thermal noise vector n). In a particular implementation, the distortion variance is an identity matrix scaled by the power of the receiver 300, which can be factored out such that the thermal noise variance is the reciprocal of a signal to noise ratio (SNR) of the non-precoded signal.

Based on Equations 2 and 3, the pre-whitening matrix 326 may be determined based on the distortion and noise covariance matrix C, such that the pre-whitening matrix 326 is $C^{-1/2}$. The received vector y (the received signal 330) may be multiplied by the pre-whitening matrix 326 to generate the conditioned received signal 331. In a particular implementation, the conditioned received signal 331 is generated according to Equation 4 as follows:

$$\tilde{y} = C^{-1/2} y = \tilde{H} s + \tilde{n} \quad \text{(Eq. 4)}$$

where $\tilde{y}$ corresponds to the conditioned received signal 331, $\tilde{H} = C^{-1/2} HP$, and $\tilde{n} = C^{-1/2}(Hd+n)$ is zero-mean complex Gaussian circularly symmetric with $E[\tilde{n}\tilde{n}^*] = I_{N_r}$. The conditioned noise variance ñ is spatially white. Because HP corresponds to the second channel estimate 340, the pre-whitening matrix 326 may be applied to the second channel estimate 340 as part of generating the conditioned received signal 331, such that the conditioned received signal 331 is based on the conditioned second channel estimate 341.

In another particular implementation, the conditioning circuitry 304 is configured to perform one or more matrix inversion operations to perform the conditioning. For example, the conditioning circuitry 304 may perform one or more matrix inversion operations on the first channel estimate 339 to determine one or more inverted matrices, and the one or more inverted matrices may be applied to the second channel estimate 340 to generate the conditioned second channel estimate 341. The conditioning circuitry 304 is further configured to apply the conditioned second channel estimate 341 to the received signal 330 to generate the conditioned received signal 331. In other implementations, the conditioning circuitry 304 is configured to perform other types of conditioning on the received signal 330 and the second channel estimate 340. After performing the conditioning, the conditioning circuitry 304 provides the conditioned received signal 331 and the conditioned second channel estimate 341 to the near ML detector 314.

The near ML detector 314 is configured to receive the conditioned received signal 331 and the conditioned second channel estimate 341 and to determine a symbol estimate 342 ("ŝ") based on the conditioned received signal 331 and the conditioned second channel estimate 341. In a particular implementation, the near ML detector 314 is configured to perform MIMO detection on the conditioned received signal 331 and the conditioned second channel estimate 341, and the symbol estimate 342 is based on the MIMO detection. Although referred to as a "near ML" detector, the symbol estimate 342 generated by the near ML detector 314 may be based on a maximum-likelihood (ML) estimate or a near ML estimate.

In a particular implementation, the symbol estimate 342 includes or corresponds to a hard-decision symbol estimate 328. In a particular implementation, the hard-decision symbol estimate 328 is given according to Equation 5 as follows:

$$\hat{s}_{ML}^{HD} = \arg\min_{s} \|\tilde{y} - \tilde{H}s\| \quad \text{(Eq. 5)}$$

However, determining the hard-decision symbol estimate 328 according to Equation 5 may be very complex and may use significant computational resources (or require additional hardware). Instead, in a particular implementation, the hard-decision symbol estimate 328 is determined using per-stream recursive de-mapping in accordance with Equation 6 as follows:

$$\hat{s}_{ML}^{HD} = \arg\min_{s^{(1)},\ldots,s^{(N_{SS})},*} \left\{ \min_{s^{(1)}} (\varepsilon(S^{(1)})), \ldots, \min_{s^{(N_{SS})}} (\varepsilon(S^{(N_{SS})})) \right\} \quad \text{(Eq. 6)}$$

which is further described with reference to FIG. 4.

In some alternative implementations, the symbol estimate 342 includes or corresponds to a soft-decision symbol estimate 329. The soft-decision symbol estimate 329 may be determined using multiple techniques, such as using a mean symbol value as the soft-decision symbol estimate 329 or approximating the soft-decision symbol estimate 329.

In a first particular implementation, the soft-decision symbol estimate 329 is determined using a mean symbol value. To illustrate, soft decision symbol estimates can be obtained from log-likelihood ratios (LLRs) of bits associated with the symbol. In a particular implementation, a mean symbol value $E(s_l)$ is determined according to Equation 7 as follows:

$$E(s_l) = \sum_{s_m \in X} s_m P(s_m) \quad \text{(Eq. 7)}$$

where $P(s_m)$ is the mth symbol probability. It may be assumed that bits within a symbol are independent due to either an interleaver within a spatial code (e.g., spatial mapping) used to generate the symbol, such as a low-density parity check (LDPC) code or a Turbo code, or due to a channel interleaver. Based on this assumption, the mth symbol probability may be determined according to Equation 8 as follows:

$$P(s_m) = \prod_{j=1}^{\log_2 M_l} P(b_{mj}) \quad \text{(Eq. 8)}$$

where $P(b_{mj})$ is the jth bit probability in the mth symbol.

Additionally, in a particular implementation, a LLR of the jth bit probability in the mth symbol is determined according to Equation 9 as follows:

$$L_{mj} = \log \frac{P(b_{mj} = +1 \mid \tilde{y})}{P(b_{mj} = -1 \mid \tilde{y})} \quad \text{(Eq. 9)}$$

Additionally, for a particular bit that represents a binary value, a sum of the probability that the particular bit has a first value and the probability that the particular bit does not have the first value is equal to one. Thus, the jth bit probability of having the first value in the mth symbol is determined according to Equation 10 as follows:

$$P(b_{mj}=+1|\tilde{y})=1-P(b_{mj}=-1|\tilde{y}) \quad \text{(Eq. 10)}$$

In some implementations, based on Equations 7-10, the mean symbol $E(s_l)$ value is determined according to Equation 11 as follows:

$$E(s_l) = \sum_{s_m \in X} s_m \frac{\prod_{j=1}^{\log_2 M_l} \left[1 + (2b_{mj} - 1)\tanh\left(\frac{L_{ij}}{2}\right)\right]}{2^{\log_2 M_l}} \quad \text{(Eq. 11)}$$

The mean symbol value $E(s_l)$ may be used as the soft-decision symbol estimate 329. In some implementations, a simplified mean symbol value is determined. For example, if the code/spatial mapping is a Gray code, the simplified mean symbol value may be determined based on symmetry in the QAM constellation. Additionally, or alternatively, in some implementations, the soft-decision symbol estimate 329 may be determined based on a look-up table, a piecewise linear function, or both. For example, a result of the tan h function in Equation 11 may be determined using a look-up table, a piecewise linear approximation, another technique, or a combination thereof.

In some implementations, the near ML detector 314 is configured to apply a weighting value to the soft-decision symbol estimate 329 to generate a weighted soft-decision symbol estimate. The weighting value may be based on a symbol variance associated with the soft-decision symbol estimate 329. In a particular implementation, the symbol variance is determined according to Equation 12 as follows:

$$\text{var}(s_l) = \sum_{s_m \in X} |s_m|^2 \frac{\prod_{j=1}^{\log_2 M_l} \left[1 + (2b_{mj} - 1)\tanh\left(\frac{L_{ij}}{2}\right)\right]}{2^{\log_2 M_l}} - E^2[s_l] \quad \text{(Eq. 12)}$$

Generation of the weighted soft-decision symbol estimate is further described with reference to FIG. 5.

In a second particular implementation, the soft-decision symbol estimate is determined using approximation. To illustrate, if the channel matrix H (corresponding to the first channel estimate 339) is square, the distortion and noise covariance matrix $C=HH^*+\sigma^{-2}I$. At high SNR, $C \approx HH^*$ and $C^{-1} \approx H^{-*}H^{-1}$. Since $C^{-1}=(C^{-1/2})^*C^{-1/2} \approx H^{-*}H^{-1}$, the pre-whitening matrix 326 is approximated $C^{-1/2} \approx H^{-1}$. Thus, in some implementations, the pre-whitening matrix 326 is replaced with an inverse matrix of the first channel estimate 339. For example, the conditioning circuitry 304 may generate and apply the inverse matrix to the received signal 330 and the second channel estimate 340 (instead of the pre-whitening matrix 326). Applying the inverse matrix to Equation 1 results in the following approximation: $C^{-1/2}y \approx H^{-1}y=Ps+d+H^{-1}n$. Because $P^*P=I$ (where I is the identity matrix), performing ML or near ML detection on the conditioned received signal 331 may be equivalent to multiplying by $P^*$. Thus, the soft-decision symbol estimate 329 may be approximated as $\hat{s}_{ML} \approx P^*H^{-1}y$, such that the soft-decision symbol estimate 329 is approximated based on an inverse, such as an inverse matrix, of the first channel estimate 339.

The TX chain processing circuitry 316 is configured to process the symbol estimate 342 and perform a conversion to the time domain to determine a time domain symbol estimate 344 ("$S_{TD}$"). For example, the TX chain processing circuitry 316 may apply TX chain processing to the symbol estimate 342 to generate the time domain symbol estimate 344. The TX chain processing may be similar to (or the same as) processing performed by one or more transmit chains of a transmitter that transmitted the multiple spatial streams received at the receiver 300. The TX chain processing may include applying a gain to the symbol estimate 342, converting the symbol estimate 342 from the frequency domain to the time domain, other processing, or a combination thereof. To convert the symbol estimate 342 to the time domain, the TX chain processing circuitry 316 may perform one or more inverse FFT (IFFT) operations on the symbol estimate 342. The time domain symbol estimate 344 may also be referred to as a processed symbol estimate.

In a particular implementation, the time domain symbol estimate 344 is determined according to Equation 13 as follows:

$$S_{TD}=g(IFFT(P\hat{s}_{ML})) \quad \text{(Eq. 13)}$$

where IFFT is the one or more IFFT operations performed by the TX chain processing circuitry 316, g is a gain applied by the TX chain processing circuitry 316, and $\hat{s}_{ML}$ is the symbol estimate 342. The symbol estimate 342 includes either the hard-decision symbol estimate 328 or the soft-decision symbol estimate 329, according to Equation 14 as follows:

$$\hat{s}_{ML} = \begin{cases} \hat{s}_{ML}^{HD} & \text{for hard-decision} \\ \hat{s}_{ML}^{SD} & \text{for soft-decision} \end{cases} \quad \text{(Eq. 14)}$$

After determining the time domain symbol estimate 344, the TX chain processing circuitry 316 provides the time domain symbol estimate 344 to the PA model determiner 318 and the distortion estimator 320.

The PA model determiner 318 is configured to determine a PA non-linearity model 346 that represents non-linearity (e.g., non-linear behavior) associated with one or more power amplifiers of a transmitter that transmitted the plurality of spatial streams received by the receiver 300. The non-linearity of the one or more power amplifiers may contribute to distortion of the received signal 330. In a particular implementation, the PA model determiner 318 includes a look-up table (LUT) that stores a plurality of PA non-linearity models for a plurality of wireless devices, and the PA model determiner 318 may select the PA non-linearity model 346 from the LUT. For example, the PA model determiner 318 may access the LUT based on the time domain symbol estimate 344, a value based on the time domain symbol estimate 344, or another value, such as an indicator value received at the receiver 300, to select the PA non-linearity model 346. In other implementations, a LUT is not used. For example, the PA model determiner 318 may be configured to estimate the PA non-linearity model 346 based on the time domain symbol estimate 344 (or a value based on the time domain symbol estimate 344) using an algorithm. After determining the PA non-linearity model 346, the PA model determiner 318 provides the PA non-linearity model 346 to the distortion estimator 320.

The distortion estimator 320 is configured to determine a time domain estimated distortion 348 based on the time domain symbol estimate 344 and the PA non-linearity model 346. For example, the distortion estimator 320 may receive the time domain symbol estimate 344 and the PA non-linearity model 346, and the distortion estimator 320 may modify the time domain symbol estimate 344 (e.g., a processed symbol estimate) based on the PA non-linearity model 346 to determine the time domain estimated distortion 348. The time domain estimated distortion 348 may also be referred to as a modified symbol estimate. In a particular implementation, the time domain estimated distortion 348 is determined according to Equation 15 as follows:

$$\text{Estimated Distortion} = PA(s_{TD}) - s_{TD} \quad \text{(Eq. 15)}$$

where $s_{TD}$ is the time domain symbol estimate 344 and PA is the PA non-linearity model 346. After determining the time domain estimated distortion 348, the distortion estimator 320 provides the time domain estimated distortion 348 to the TX chain processing removal circuitry 322.

The TX chain processing removal circuitry 322 is configured to generate an estimated distortion 350 ($\hat{d}$) based on the time domain estimated distortion 348. For example, TX chain processing removal circuitry 322 may apply inverse TX chain processing to the time domain estimated distortion 348 to generate the estimated distortion 350. The inverse TX chain processing may be configured to remove or "undo" the TX chain processing applied by the TX chain processing circuitry 316. The inverse TX chain processing may include reducing a gain of the time domain estimated distortion 348, converting the time domain estimated distortion 348 from the time domain to the frequency domain, other processing, or a combination thereof. To convert the time domain estimated distortion 348 to the frequency domain, the TX chain processing removal circuitry 322 may perform one or more FFT operations on the time domain estimated distortion 348 to generate the estimated distortion 350. After determining the estimated distortion 350, the TX chain processing removal circuitry 322 provides the estimated distortion to the channel/distortion combiner 324.

The channel/distortion combiner 324 is configured to generate a distortion signal 352 based on the estimated distortion 350 and the first channel estimate 339. For example, the channel/distortion combiner 324 may apply the first channel estimate 339 to the estimated distortion 350, such as by multiplying the estimated distortion 350 by the first channel estimate 339, to generate the distortion signal 352. After generating the distortion signal 352, the channel/distortion combiner 324 provides the distortion signal 352 to the combiner 306.

The combiner 306 is configured to combine the received signal 330 and the distortion signal 352 to generate a reduced distortion signal 332. For example, the combiner 306 may subtract the distortion signal 352 from the received signal 330 to generate the reduced distortion signal 332. Due to the subtraction, the reduced distortion signal 332 may have less distortion than the received signal 330. In a particular implementation, a reduced distortion received vector $\hat{y}$ (corresponding to the reduced distortion signal 332) is generated according to Equation 16 as follows:

$$\hat{y} = y - H\hat{d} = HPs + He + n \quad \text{(Eq. 16)}$$

where $H\hat{d}$ corresponds to the distortion signal 352 and e is the residual noise post distortion removal. In a particular implementation, the combiner 306 includes an adder, and the distortion signal 352 is negated before being added to the received signal 330 by the adder to generate the reduced distortion signal 332. In another particular implementation, the combiner 306 includes a subtractor, and the distortion signal 352 is subtracted from the received signal 330 by the subtractor to generate the reduced distortion signal 332. After generating the reduced distortion signal 332, the combiner 306 provides the reduced distortion signal 332 to the near ML detector 308.

The near ML detector 308 is configured to determine LLRs 334 based on the reduced distortion signal 332 and the second channel estimate 340. In a particular implementation, the near ML detector 308 is configured to perform MIMO detection (or a portion thereof) on the reduced distortion signal 332 and the second channel estimate 340, and the LLRs 334 are based on at least a portion of the MIMO detection. Although referred to as a "near ML" detector, the LLRs 334 generated by the near ML detector 308 may be based on a maximum-likelihood (ML) estimate or a near ML estimate. In a particular implementation, the LLRs 334 are generated using per-stream recursive de-mapping, as further described with reference to FIG. 4. After determining the LLRs 334, the near ML detector 308 provides the LLRs 334 to the multiplexer 310. The multiplexer 310 is configured to multiplex the LLRs 334 to generate an interleaved signal 336 that is provided to the de-interleaver decoder 312.

The de-interleaver decoder 312 is configured to decode, or otherwise process, the interleaved signal 336 to generate a decoded signal 338. For example, the de-interleaver decoder 312 may de-interleave the interleaved signal 336 to generate the decoded signal 338. De-interleaving may be performed to account for interleaving that is associated with the spatial mapping (e.g., precoding) performed on data prior to transmission as the multiple spatial streams that are received at the receiver 300. In some implementations, the de-interleaver decoder 312 is configured to perform additional decoding operations, such as error correction code (ECC) decoding operations or other decoding operations. In other implementations, other decoding operations may be performed further downstream. In a particular implementation, the de-interleaver decoder 312 includes or corresponds to the decoder 119 of FIG. 1. After generating the decoded signal 338, the receiver 300 provides the decoded signal 338 downstream for additional processing and conversion into received data.

Thus, the receiver 300 of FIG. 3 enables improved distortion reduction compared to other receivers that perform distortion reduction based on channel estimates determined using linear detectors. It is to be noted that FIG. 3 illustrates circuitry configured to perform a single iteration of a distortion reduction process. In some implementations, the circuitry of FIG. 3 is further configured to perform multiple iterations of an iterative distortion reduction process. For example, the reduced distortion signal 332 may be fed back to the components 302, 304, 314, 316, 318, 320, 322, 324, and 306 to perform another iteration of removing an estimated distortion from a signal. Multiple iterations of the iterative distortion reduction process may be performed. For example, a particular number of iterations may be performed, or the iterative distortion reduction process may be performed until a confidence level associated with the decoded signal 338 satisfies a threshold. Although particular operations described with reference to FIG. 3 are performed on vectors or matrices, such description is not intended to be limiting. In other implementations, data corresponding to any of the vectors or the matrices described with reference to FIG. 3 may be formatted in other ways, and similar operations may be performed on the data to enable the operations described with reference to FIG. 3.

Figure 4:
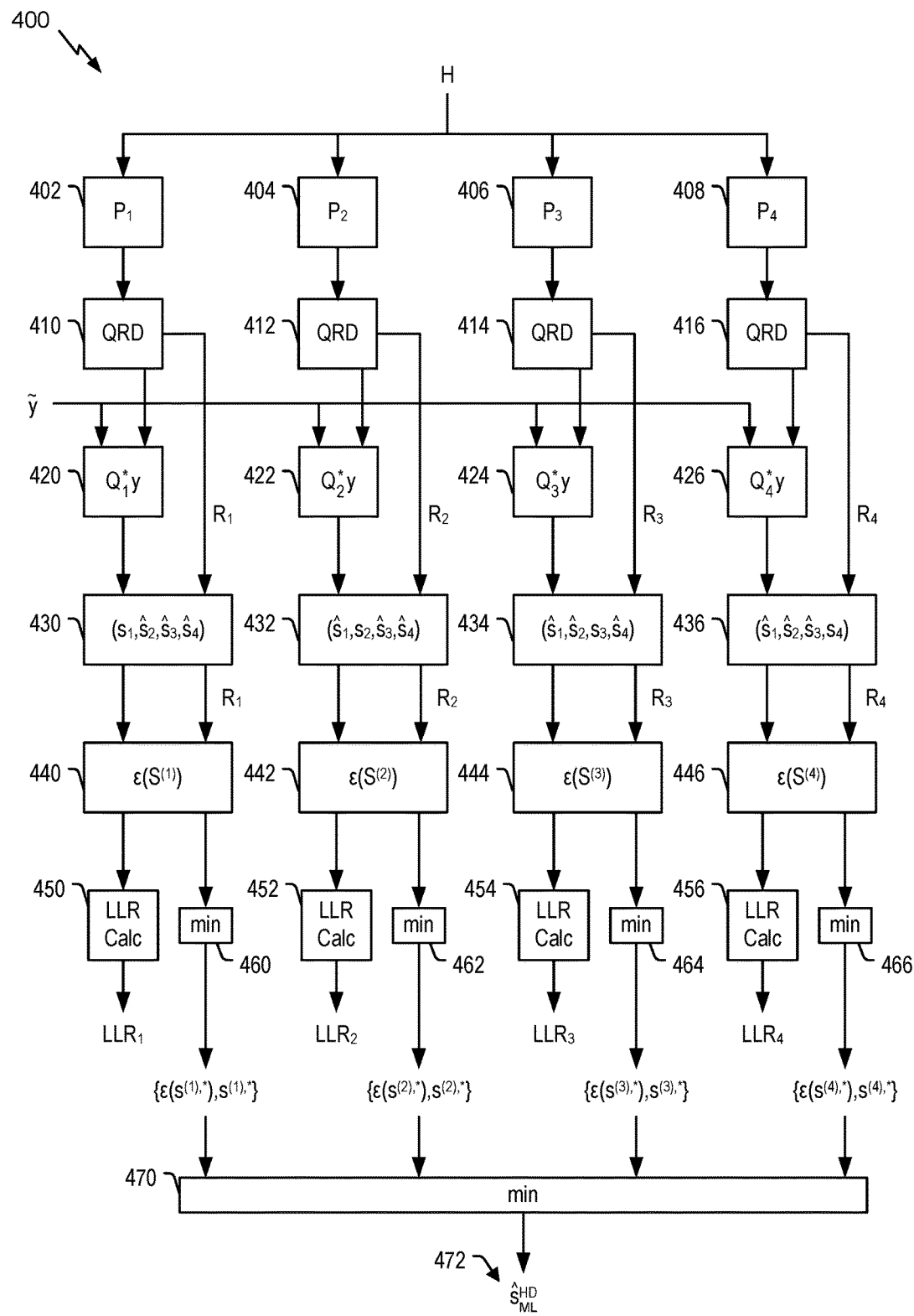
FIG. 4 is a diagram of a particular illustrative aspect of a near maximum likelihood detector configured to determine a hard-decision symbol estimate.

Referring to FIG. 4, a particular illustrative example of a near ML detector configured to determine a hard-decision symbol estimate is shown and generally designated 400. In a particular implementation, the near ML detector 400 includes or corresponds to the near ML detector 314 or the near ML detector 308 of FIG. 3.

The near ML detector 400 is configured to determine a hard-decision symbol estimate 472 ($\hat{s}_{ML}^{HD}$) based on a channel estimate (H) and a received symbol vector ($\tilde{y}$). In a particular implementation, the hard-decision symbol estimate 472 includes or corresponds to the hard-decision symbol estimate 328 of FIG. 3. The near ML detector 400 may be configured to determine the hard-decision symbol estimate 472 using per-stream recursive de-mapping, as further described herein. For example, a receiver that includes the near ML detector 400 may receive multiple spatial streams that correspond to a received signal, and the near ML detector 400 may include processing for each spatial stream. In a particular implementation illustrated in FIG. 4, four spatial signals are received and processed, and the channel estimate H is a 4×4 matrix. In other implementations, less than four or more than four spatial streams may be received and processed. The near ML detector 400 may also be referred to as a decision feedback equalizer. Components of FIG. 4 are described as various units herein. The units may include or correspond to hardware, such as a processor, a controller, a field-programmable gate array (FPGA), an application-specific integrated circuit (ASIC), dedicated circuitry, computer-readable instructions that are executable by a processor, firmware, or a combination thereof.

The channel estimate H is provided to permutation units. Each permutation unit may be associated with a different spatial stream. In a particular implementation, the permutation units include a first permutation unit 402 ("P1") associated with a first spatial stream, a second permutation unit 404 ("P2") associated with a second spatial stream, a third permutation unit 406 ("P3") associated with a third spatial stream, and a fourth permutation unit 408 ("P4") associated with a fourth spatial stream. Each of the permutation units 402-408 is configured to apply a permutation matrix to the channel estimate H to generated a permuted channel matrix where the column associated with the spatial stream is first. As an illustrative example, the first permutation unit 402 may apply a first permutation matrix to the channel estimate H to cause the first column and the fourth column (the column associated with the first spatial stream) of the channel estimate to be swapped, while the second and third columns of the channel estimate H remain the same. As another example, the second permutation unit 404 may apply a second permutation matrix to the channel estimate H to cause the first column and the third column (the column associated with the second spatial stream) to be swapped, while the second and fourth columns remain the same.

The permuted channel estimates that are generated by the permutation units 402-408 are provided to QR decomposition (QRD) units. Each QRD unit may be associated with a different spatial stream. In a particular implementation, the QRD units include a first QRD unit 410 ("QRD1") associated with the first spatial stream, a second QRD unit 412 ("QRD2") associated with the second spatial stream, a third QRD unit 414 ("QRD3") associated with the third spatial stream, and a fourth QRD unit 416 ("QRD4") associated with the fourth spatial stream. Each of the QRD units 410-416 is configured to perform QR decomposition on the corresponding permuted channel estimate to generate a first matrix Q and a second matrix R. The first matrix Q may be an orthogonal matrix, and the second matrix R may be an upper triangular (e.g., right triangular) matrix. In a particular implementation, the first QRD unit 410 generates a first matrix Q1 and a second matrix R1, the second QRD unit 412 generates a first matrix Q2 and a second matrix R2, the third QRD unit 414 generates a first matrix Q3 and a second matrix R3, and the fourth QRD unit 416 generates a first matrix Q4 and a second matrix R4. The first matrices Q1-Q4 are provided to multipliers, and the second matrices R1-R4 are provided to tuple determination units.

The first matrices Q1-Q4 and the received symbol vector $\tilde{y}$ are received by a plurality of multipliers. Each multiplier may be associated with a different spatial stream, and each multiplier is configured to multiply the received symbol vector $\tilde{y}$ by the corresponding first matrix Q. In a particular implementation, the plurality of multipliers includes a first multiplier 420 configured to multiply the received symbol vector $\tilde{y}$ by the first matrix Q1, a second multiplier 422 configured to multiply the received symbol vector $\tilde{y}$ by the first matrix Q2, a third multiplier 424 configured to multiply the received symbol vector $\tilde{y}$ by the first matrix Q3, and a fourth multiplier 426 configured to multiply the received symbol vector $\tilde{y}$ by the first matrix Q4. Results from the multipliers 420-426 are provided to enumerators.

The results of the multipliers 420-426 and the second matrices R1-R4 are received by enumerators. Each enumerator may be associated with a different spatial stream, and each enumerator may be configured to generate a corresponding tuple of symbols by enumerating symbols for a spatial layer corresponding to the spatial stream and determining symbols of the other spatial layers based on a QAM constellation associated with the multiple spatial streams, such as by slicing. In a particular implementation, the enumerators include a first enumerator 430 configured to generate a first set of tuples of symbols based on the results of the first multiplier 420 and the second matrix R1, a second enumerator 432 configured to determine a second set of tuples of symbols based on the results of the second multiplier 422 and the second matrix R2, a third enumerator 434 configured to determine a third set of tuples of symbols based on the results of the third multiplier 424 and the second matrix R3, and a fourth enumerator 436 configured to determine a fourth set of tuples of symbols based on the results of the fourth multiplier 426 and the second matrix R4. The sets of tuples and the second matrices R1-R4 may be provided to distance vector determination units.

The sets of tuples and the second matrices R1-R4 are received by distance vector determination units. Each distance vector determination unit may be associated with a different spatial stream, and each distance vector determination unit may be configured to determine a corresponding distance vector. Each distance vector may include a set of distance values between symbols in the corresponding set of tuples. In a particular implementation, the distance vector determination units include a first distance vector determination unit 440 configured to determine a first distance vector based on the first set of tuples, a second distance vector determination unit 442 configured to determine a second distance vector based on the second set of tuples, a third distance vector determination unit 444 configured to determine a third distance vector based on the third set of tuples, and a fourth distance vector determination unit 446 configured to determine a fourth distance vector based on the fourth set of tuples. A set of distance vectors generated by the distance vector determination units 440-446 may be denoted as $\epsilon(S^{(1)}), \ldots, \epsilon(S^{(N_{ss})})$, where the length of each of the distance vectors is M and an element in the distance vector $\epsilon(S^{(n)})$ is based on the distance of one of the tuples in the set of tuples $$S^{(n)} = \{(\hat{s}_{1,1}, \hat{s}_{2,1}, \ldots, \hat{s}_{n-1,1}, s_{n,1}, \hat{s}_{n+1,1}, \ldots, \hat{s}_{N_{ss},1}), \ldots, (\hat{s}_{1,M}, \hat{s}_{2,M}, \ldots, \hat{s}_{n-1,M}, s_{n,M}, \hat{s}_{n+1,M}, \ldots, \hat{s}_{N_{ss},M})\}.$$

For this set of tuples, enumeration is on the nth spatial layer $S_{n,1}, \ldots, S_{n,M}$, as performed by the enumerators 430-436, and the remaining symbols are based on slicing to the closest point in the QAM constellation (using the Ŝ notation). The distance vectors determined by the distance vector determination units 440-446 and the sets of tuples determined by the enumerators 430-436 are provided to corresponding minimization units, and optionally to corresponding LLR calculation units.

In some implementations, the distance vectors and the sets of tuples are received at LLR calculation units. Each LLR calculation unit may be associated with a different spatial stream, and each LLR calculation unit may be configured to determine one or more LLR values based on the corresponding distance vector and the corresponding set of tuples. In a particular implementation, the LLR calculation units include a first LLR calculation unit 450 configured to determine a first set of LLR values LLR1 based on the first distance vector and the first set of tuples, a second LLR calculation unit 452 configured to determine a second set of LLR values LLR2 based on the second distance vector and the second set of tuples, a third LLR calculation unit 454 configured to determine a third set of LLR values LLR3 based on the third distance vector and the third set of tuples, and a fourth LLR calculation unit 456 configured to determine a fourth set of LLR values LLR4 based on the fourth distance vector and the fourth set of tuples. In some implementations, the sets of LLR values LLR1-LLR4 include or correspond to the LLRs 334 of FIG. 3.

The distance vectors and the tuples of symbols are also (or in the alternative) received at minimization units. Each minimization unit may be associated with a different spatial stream, and each minimization unit may be configured to determine a smallest distance and an associated tuple of symbols, denoted $\{\epsilon(s^{(n,*)}), s^{(n,*)}\}$, from M tuples of the corresponding set of tuples and from the corresponding distance vector. In a particular implementation, the minimization units include a first minimization unit 460 configured to determine a first smallest distance and a first associated tuple of symbols based on the first set of tuples of values and the first distance vector, a second minimization unit 462 configured to determine a second smallest distance and a second associated tuple of symbols based on the second set of tuples of values and the second distance vector, a third minimization unit 464 configured to determine a third smallest distance and a third associated tuple of symbols based on the third set of tuples of values and the third distance vector, and a fourth minimization unit 466 configured to determine a fourth smallest distance and a fourth associated tuple of symbols based on the fourth set of tuples of values and the fourth distance vector. The smallest distance values and the associated tuples determined by the minimization units 460-466 are provided to a minimization unit 470.

The minimization unit 470 is configured to determine the hard-decision symbol estimate 472 based on the received smallest distances and the associated tuples. For example, the minimization unit 470 may identify a "global minimum" (e.g., a smallest distance) from the four smallest distances received from the minimization units 460-466. The minimization unit 470 may identify the tuple associated with the global minimum, and the minimization unit 470 may identify a symbol estimate that corresponds to the tuple. The symbol estimate may be output as the hard-decision symbol estimate 472.

Thus, the near ML detector 400 of FIG. 4 enables determination of the hard-decision symbol estimate 472, the sets of LLR values LLR1-LLR4, or both. In some implementations, the sets of LLR values LLR1-LLR4 are not used (or are discarded), and only the hard-decision symbol estimate 472 is used, such as by the near ML detector 314 of FIG. 3. In other implementations, the hard-decision symbol estimate 472 is not used (or is discarded), and only the sets of LLR values LLR1-LLR4 are used, such as by the near ML detector 308 of FIG. 3.

Figure 5:
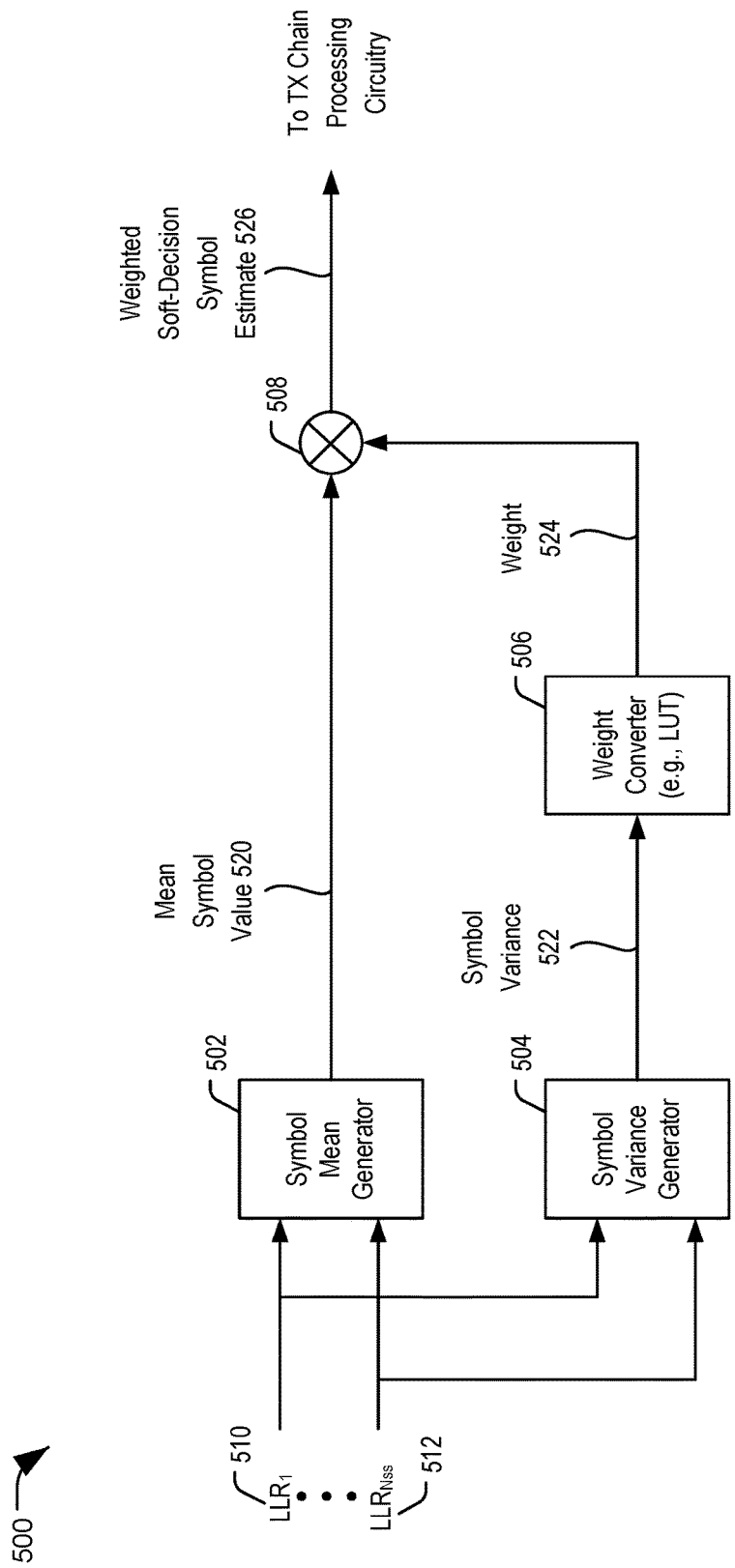
FIG. 5 is a block diagram of a particular illustrative aspect of a near maximum likelihood detector configured to determine a soft-decision symbol estimate.

Referring to FIG. 5, a particular illustrative example of a near ML detector configured to determine a soft-decision symbol estimate is shown and generally designated 500. In a particular implementation, the near ML detector 500 includes or corresponds to the near ML detector 314 or the near ML detector 308 of FIG. 3. The near ML detector 500 includes a symbol mean generator 502 coupled to a multiplier 508 and a symbol variance generator 504 coupled to a weight converter 506. The weight converter 506 is further coupled to the multiplier 508.

The symbol mean generator 502 is configured to determine a mean symbol value 520 based on a plurality of LLRs include a first LLR 510 ("LLR1") and a second LLR 512 ("LLRNss"). The plurality of LLRs may be determined based on a signal received at a receiver of a first device from a transmitter of the second device, as described with reference to FIGS. 1 and 3. In some implementations, the symbol mean generator 502 is configured to determine the mean symbol value 520 according to Equation 11. In a particular implementation, the symbol mean generator 502 includes a LUT. For example, the symbol mean generator 502 may access a LUT to select a result of the tan h function in Equation 11 based on a LLR. In an alternate implementation, the symbol mean generator 502 is configured to determine a result of the tan h function in Equation 11 using a piecewise linear approximation. In another particular implementation, the symbol mean generator 502 is configured to use a LUT and a piecewise linear approximation to determine one or more values used to determine the mean symbol value 520, such as a result of the tan h function in Equation 11. After determining the mean symbol value 520, the symbol mean generator 502 provides the mean symbol value 520 to the multiplier 508.

The symbol variance generator 504 is configured to determine a symbol variance 522 based on the plurality of LLRs. In some implementations, the symbol variance generator 504 is configured to determine the symbol variance 522 according to Equation 12. If the spatial mapping/precoding used by the transmitter is a Gray code, the symbol variance 522 can be determined in a closed form. In some implementations, the symbol variance generator 504 is configured to determine one or more values used to determine the symbol variance 522, such as a result of the tan h function in Equation 12, using a LUT, a piecewise linear approximation, or both. After determining the symbol variance 522, the symbol variance generator 504 provides the symbol variance 522 to the weight converter 506.

The weight converter 506 is configured to determine a weight 524 based on the symbol variance 522. The weight converter 506 may convert symbol variances to weights that indicate a reliability of the mean symbol value 520. For example, if the symbol variance 522 is small, the mean symbol value 520 may have a high reliability, and if the symbol variance 522 is large, the mean symbol value 520 may have a low reliability. Thus, the weight 524 may be inversely proportional to the symbol variance 522. In a particular implementation, the weight converter 506 is configured to access a LUT based on the symbol variance 522 to select the weight 524. For example, the LUT may include a plurality of weights that each correspond to a symbol variance (or range of symbol variances). In a particular implementation, the weight 524 is selected from a range of 0 to 1. After determining the weight 524, the weight converter 506 provides the weight 524 to the multiplier 508.

The multiplier 508 is configured to apply the weight 524 to the mean symbol value 520 to generate a weighted soft-decision symbol estimate 526. For example, the multiplier 508 may multiply the mean symbol value 520 by the weight 524 to generate the weighted soft-decision symbol estimate 526. Because the weight 524 is based on the symbol variance 522 (that indicates reliability of the mean symbol value 520), the weighted soft-decision symbol estimate 526 may indicate a reliability associated with the weighted soft-decision symbol estimate 526. The weighted soft-decision symbol estimate 526 may be used to generate an estimated distortion. To illustrate, the weighted soft-decision symbol estimate 526 may include or correspond to the soft-decision symbol estimate 329 of FIG. 3 that is used to determine the estimated distortion 350 of FIG. 3.

Figure 6:
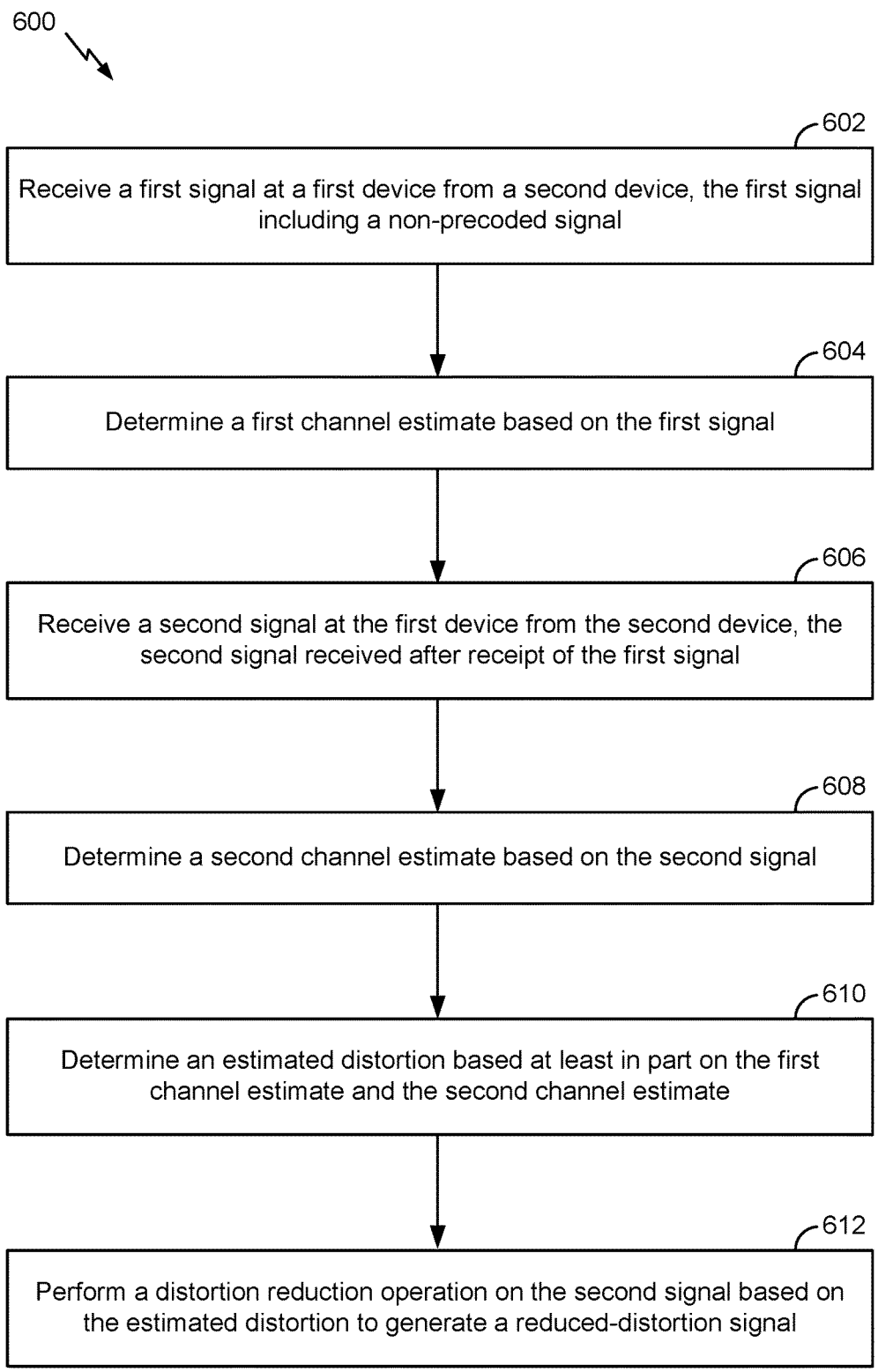
FIG. 6 is a flow chart that illustrates an illustrative method of performing a distortion reduction operation based on estimated distortion.

Referring to FIG. 6, a flow chart of an illustrative method of performing a distortion reduction operation based on estimated distortion is shown and generally designated 600. In a particular implementation, the method 600 may be performed by component(s) of the first device 102 of FIG. 1, such as the receiver 108 and the distortion reduction circuitry 110, the first device 202 of FIG. 2, such as the receiver 208 or the distortion reduction circuitry 210, or by component(s) of the receiver 300 of FIG. 3.

The method 600 includes receiving a first signal at a first device from a second device, at 602. The first signal includes a non-precoded signal. For example, the first signal may include or correspond to the first signal 150, the first device may include or correspond to the first device 102, and the second device may include or correspond to the second device 130.

The method 600 includes determining a first channel estimate based on the first signal, at 604. For example, the first channel estimate may include or correspond to the first channel estimate 112 of FIG. 1.

The method 600 includes receiving a second signal at the first device from the second device, at 606. The second signal is received after receipt of the first signal. For example, the second signal may include or correspond to the second signal 152 of FIG. 1.

The method 600 includes determining a second channel estimate based on the second signal, at 608. For example, the second channel estimate may include or correspond to the second channel estimate 114 of FIG. 1.

The method 600 includes determining an estimated distortion based at least in part on the first channel estimate and the second channel estimate, at 610. For example, the estimated distortion may include or correspond to the estimated distortion 116 of FIG. 1.

The method 600 further includes performing a distortion reduction operation on the second signal based on the estimated distortion to generate a reduced-distortion signal, at 612. For example, a distortion reduction operation may be performed on the second signal 152 based on the estimated distortion 116 to generate the distortion-reduced signal 118, as described with reference to FIG. 1.

In a particular implementation, receiving the first signal includes receiving, from each of a plurality of antennas of the first device, a corresponding null data packet (NDP). For example, with reference to FIG. 2, the first device 202 receives the NDPs 250-254 from the second device 230, and each of the antennas 240-249 (and corresponding transmit chains) of the second device 230 are used to transmit at least a portion of the NDPs 250-254. In some implementations, receiving the first signal includes receiving a first NDP from a first antenna of the plurality of antennas and receiving a second NDP from a second antenna of the plurality of antennas. For example, with reference to FIG. 2, the first NDP 250 is received from the first antenna 240 and the second antenna 242, the second NDP 252 is received from the third antenna 244 and the fourth antenna 246, and the third NDP 254 is received from the fifth antenna 248 and the sixth antenna 249. Determining the first channel estimate may include determining a first sub-channel estimate based on the first NDP, determining a second sub-channel estimate based on the second NDP, and determining the first channel estimate based on the first sub-channel estimate and the second sub-channel estimate. For example, with reference to FIG. 2, the first sub-channel estimate 212 is determined based on the first NDP 250, the second sub-channel estimate 214 is determined based on the second NDP 252, and the first channel estimate 218 is determined based on the first sub-channel estimate 212 and the second sub-channel estimate 214.

In a particular implementation, the method 600 includes determining a pre-whitening matrix based on the first channel estimate and applying the pre-whitening matrix to the second signal and to the second channel estimate. The method 600 further includes, after applying the pre-whitening matrix, determining a symbol estimate based on the second signal and the second channel estimate. The estimated distortion is based on the symbol estimate. To illustrate, with reference to FIG. 3, the pre-whitening matrix 326 may be determined based on the first channel estimate 339 (in some implementations based on with Equation 3). In some implementations, determining the pre-whitening matrix includes estimating a thermal noise variance based on the first signal, determining a distortion and thermal noise covariance matrix based on the first channel estimate and the thermal noise variance, and determining the pre-whitening matrix based on the distortion and noise covariance matrix.

In some implementations, the method 600 further includes, after applying the pre-whitening matrix, performing multiple-input, multiple-output (MIMO) detection on the second signal and the second channel estimate. The symbol estimate is based on the MIMO detection. For example, with reference to FIG. 3, the near ML detector 314 may determine the symbol estimate 342 based on MIMO detection performed on the conditioned received signal 331 and the conditioned second channel estimate 341. Additionally, or alternatively, the method 600 may include applying transmit chain processing to the symbol estimate to generate a processed symbol estimate and modifying the processed symbol estimate based on a power amplifier (PA) model to generate a modified symbol estimate. The estimated distortion is based on the processed symbol estimate and the modified symbol estimate. To illustrate, with reference to FIG. 3, the TX chain processing circuitry 316 may apply TX chain processing to the symbol estimate 342, such as by applying a gain and converting from the frequency domain to the time domain, to generate the time domain symbol estimate 344. Additionally, the distortion estimator 320 may generate the time domain estimated distortion 348 based on the time domain symbol estimate 344 and the PA nonlinearity model 346 provided by the PA model determiner 318.

In some implementations, the symbol estimate includes a soft-decision symbol estimate. For example, the symbol estimate may include or correspond to the soft-decision symbol estimate 329 of FIG. 3. In a particular implementation, the soft-decision symbol estimate is determined based at least in part on a look-up table, a piecewise linear approximation, or both. For example, the soft-decision symbol estimate 329 may be determined according to Equation 11, and one or more intermediate values, such as a result of the tan h function in Equation 11, may be determined using a LUT, a piecewise linear approximation, or both. In an alternate implementation, the soft-decision symbol estimate is approximated based on an inverse of the first channel estimate. For example, the soft-decision symbol estimate 329 may be determined based on an inverse of the first channel estimate 339. In some implementations, the method 600 further includes applying a weighting value to the soft-decision symbol estimate to generate a weighted soft-decision symbol estimate. The weighting value is based on a symbol variance associated with the soft-decision symbol estimate, and the estimated distortion is based on the weighted soft-decision symbol estimate. For example, with reference to FIG. 5, the multiplier 508 may multiply the mean symbol value 520 by the weight 524 to generate the weighted soft-decision symbol estimate 526, and the weight 524 may be determined based on the symbol variance 522 (which in some implementations is determined according to Equation 12).

Thus, the method 600 of FIG. 6 may enable improved distortion reduction as compared to other methods of reducing distortion. For example, the method 600 may result in a more accurate estimated distortion such that, when the distortion reduction is performed, the distortion-reduced signal is more accurate. As another example, the method 600 may be performed as part of an iterative distortion reduction process, and the method 600 may enable completion of the process in fewer iterations than other distortion reduction processes, which may reduce power consumption at a wireless device that performs the method 600.

Figure 7:
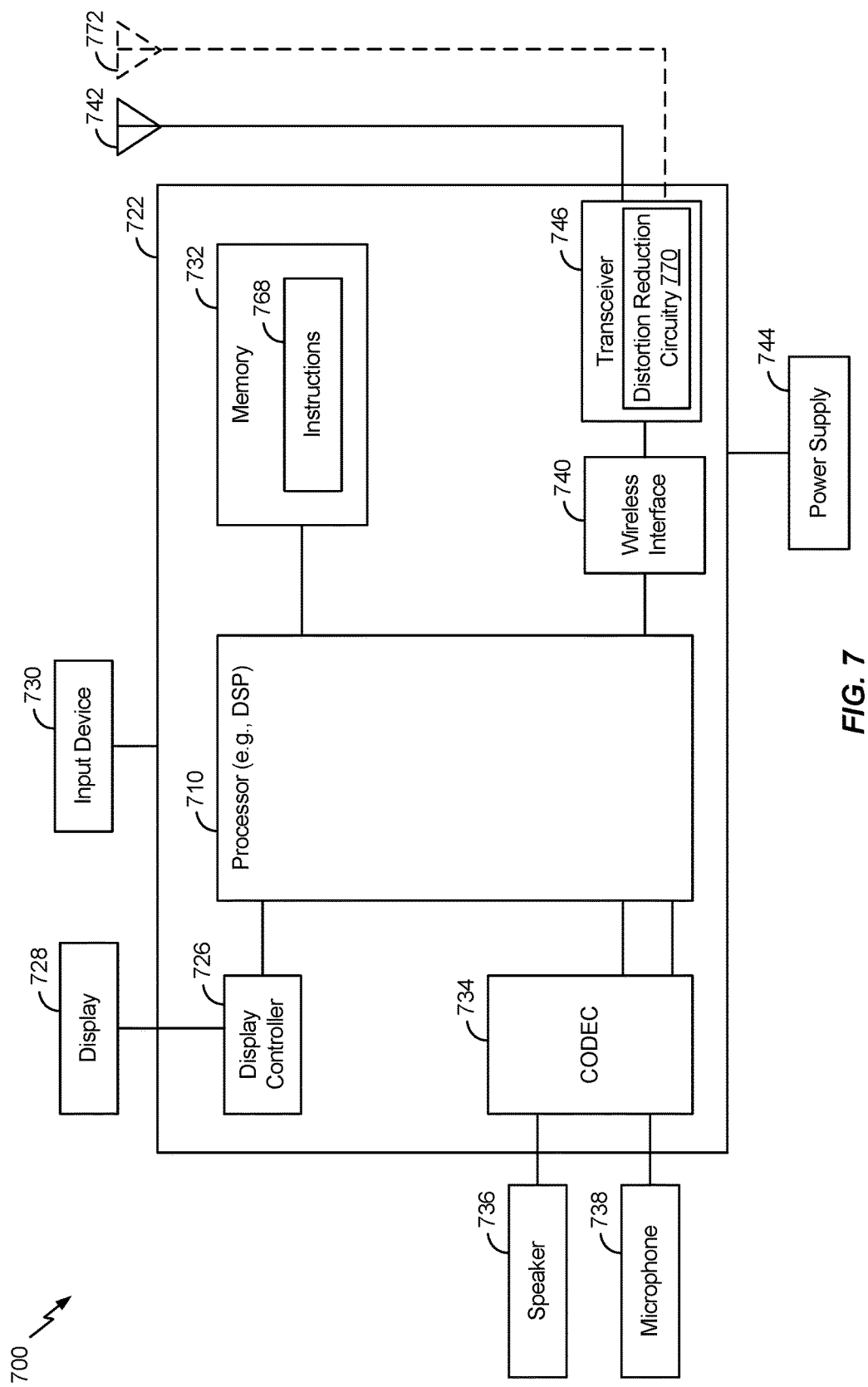
FIG. 7 is a block diagram of a wireless device that includes distortion reduction circuitry in accordance with the present disclosure.

Referring to FIG. 7, a block diagram of a particular illustrative implementation of a device (e.g., a wireless communication device) is depicted and generally designated 700. In various implementations, the device 700 may have more or fewer components than illustrated in FIG. 7. In an illustrative aspect, the device 700 may correspond to the first device 102 of FIG. 1 or the first device 202 of FIG. 2. In an illustrative aspect, the device 700 may perform one or more operations described with reference to systems and methods of FIGS. 1-6.

In a particular implementation, the device 700 includes a processor 710, such as a central processing unit (CPU) or a digital signal processor (DSP), coupled to a memory 732. The memory 732 includes instructions 768 (e.g., executable instructions) such as computer-readable instructions or processor-readable instructions. The instructions 768 may include one or more instructions that are executable by a computer, such as the processor 710.

The device 700 may include a display controller 726 that is coupled to the processor 710 and to a display 728. A coder/decoder (CODEC) 734 may also be coupled to the processor 710. A speaker 736 and a microphone 738 may be coupled to the CODEC 734.

FIG. 7 also illustrates that a wireless interface 740, such as a wireless controller, and a transceiver 746 may be coupled to the processor 710 and to an antenna 742, such that wireless data received via the antenna 742, the transceiver 746, and the wireless interface 740 may be provided to the processor 710. In some implementations, the device 700 also includes a second antenna 772 coupled to the processor 710 by the wireless interface 740 and the transceiver 746 such that wireless data received via the second antenna 772, the transceiver 746, and the wireless interface 740 may be provided to the processor 710. Although two antennas are illustrated, in other implementations, the device 700 may include more than two antennas or a single antenna. The transceiver 746 may include distortion reduction circuitry 770 configured to reduce distortion of a received signal. In a particular aspect, the distortion reduction circuitry 770 may include or correspond to the distortion reduction circuitry 110 of FIG. 1, the distortion reduction circuitry 210 of FIG. 2, or one or more of the components 302, 304, 306, 314, 316, 318, 320, 322, and 324 of FIG. 3. In some implementations, the transceiver may include a transmitter, a receiver, or both. The receiver may include the distortion reduction circuitry 770.

In some implementations, the processor 710, the display controller 726, the memory 732, the CODEC 734, the wireless interface 740, and the transceiver 746 are included in a system-in-package or system-on-chip device 722. In some implementations, an input device 730 and a power supply 744 are coupled to the system-on-chip device 722. Moreover, in a particular implementation, as illustrated in FIG. 7, the display 728, the input device 730, the speaker 736, the microphone 738, the antenna 742, the second antenna 772, and the power supply 744 are external to the system-on-chip device 722. In a particular implementation, each of the display 728, the input device 730, the speaker 736, the microphone 738, the antenna 742, the second antenna 772, and the power supply 744 may be coupled to a component of the system-on-chip device 722, such as an interface or a controller.

In an illustrative implementation, the memory 732 includes or stores the instructions 768 (e.g., executable instructions), such as computer-readable instructions or processor-readable instructions. For example, the memory 732 may include or correspond to a non-transitory computer readable medium storing the instructions 768. The instructions 768 may include one or more instructions that are executable by a computer, such as the processor 710.

In a particular implementation, the device 700 includes a non-transitory computer readable medium (e.g., the memory 732) storing instructions (e.g., the instructions 768) that, when executed by a processor (e.g., the processor 710), may cause the processor to perform operations including initiating receipt of a first signal at a first device from a second device. The first signal includes a non-precoded signal. The operations include determining a first channel estimate based on the first signal. The operations include initiating receipt of a second signal at the first device from the second device, the second signal received after receipt of the first signal. The operations include determining a second channel estimate based on the second signal. The operations include determining an estimated distortion based at least in part on the first channel estimate and the second channel estimate. The operations further include initiating performance of a distortion reduction operation on the second signal based on the estimated distortion to generate a reduced-distortion signal.

The device 700 may include a wireless telephone, a mobile communication device, a mobile device, a mobile phone, a smart phone, a cellular phone, a laptop computer, a desktop computer, a computer, a tablet computer, a set top box, a personal digital assistant (PDA), a display device, a television, a gaming console, an augmented reality (AR) device, a virtual reality (VR) device, a music player, a radio, a video player, an entertainment unit, a communication device, a fixed location data unit, a personal media player, a digital video player, a digital video disc (DVD) player, a tuner, a camera, a navigation device, a decoder system, an encoder system, a vehicle, a component of a vehicle, or any combination thereof.

It should be noted that various functions performed by the one or more components of the systems described with reference to FIGS. 1-6 and the device 700 are described as being performed by certain components or circuitry. This division of components and circuitry is for illustration only. In an alternate aspect, a function performed by a particular component may be divided amongst multiple components. Moreover, in an alternate aspect, two or more components described with reference to FIGS. 1-7 may be integrated into a single component. Each component described with reference to FIGS. 1-7 may be implemented using hardware (e.g., a field-programmable gate array (FPGA) device, an application-specific integrated circuit (ASIC), a DSP, a controller, etc.), software (e.g., instructions executable by a processor), or any combination thereof.

In conjunction with the described aspects, an apparatus includes means for receiving a first signal and a second signal from a second device. The first signal includes a non-precoded signal. The means for receiving may include or correspond to the first receive antenna 120 or the Rth receive antenna 122 of FIG. 1, the first antenna 220 or the second antenna 222 of FIG. 2, the antenna 742 or the second antenna 772 of FIG. 7, one or more other structures or circuits configured to receive the first signal and the second signal from the second device, or any combination thereof.

The apparatus further includes means for reducing distortion of the second signal based on an estimated distortion. The estimated distortion is based at least in part on a first channel estimate and a second channel estimate. The first channel estimate is based on the first signal. The second channel estimate is based on the second signal. The means for reducing distortion may include or correspond to the receiver 108 or the distortion reduction circuitry 110 of FIG. 1, the receiver 208 or the distortion reduction circuitry 210 of FIG. 2, the components 302, 304, 306, 314, 316, 318, 320, 322, and 324 of FIG. 3, the transceiver 746 or the distortion reduction circuitry 770 of FIG. 7, one or more other structures or circuits configured to reduce distortion of the second signal based on the estimated distortion, or any combination thereof.

In a particular implementation, the means for reducing distortion includes means for determining a symbol estimate based at least in part on the first channel estimate and the second channel estimate. The estimated distortion is based on the symbol estimate. The means for determining a symbol estimate may include or correspond to the near ML detector 314 of FIG. 3, the near ML detector 400 of FIG. 4, the near ML detector 500 of FIG. 5, one or more other structures or circuits configured to determine the symbol estimate, or any combination thereof.

In a particular implementation, the apparatus further includes means for decoding the second signal after the distortion is reduced. The means for decoding may include or correspond to the decoder 119 of FIG. 1, the de-interleaver decoder 312 of FIG. 3, the processor 710 of FIG. 7, one or more other structures or circuits configured to decode the second signal, or any combination thereof.

One or more of the disclosed aspects may be implemented in a system or an apparatus, such as the device 700, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 700 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, a component integrated within a vehicle, any other device that includes a processor or that stores or retrieves data or computer instructions, or a combination thereof. As another illustrative, non-limiting example, the device 700 may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

While FIG. 7 illustrates a wireless communication device including distortion reduction circuitry, distortion reduction circuitry may be included in various other electronic devices. For example, distortion reduction circuitry as described with references to FIGS. 1-6, may be included in one or more components of a base station.

A base station may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA.

Various functions may be performed by one or more components of the base station, such as sending and receiving messages and data (e.g., audio data). The one or more components of the base station may include a processor (e.g., a CPU), a transcoder, a memory, a network connection, a media gateway, a demodulator, a transmission data processor, a receiver data processor, a transmission multiple input-multiple output (MIMO) processor, transmitters and receivers (e.g., transceivers), an array of antennas, or a combination thereof. The base station, or one or more of the components of the base station, may include distortion reduction circuitry, as described above with reference to FIGS. 1-6.

During operation of a base station, one or more antennas of the base station may receive a data stream from a wireless device. A transceiver may receive the data stream from the one or more antennas and may provide the data stream to the demodulator. In a particular implementation, the transceiver of the base station may include distortion reduction circuitry, as described above with reference to FIGS. 1-6. The demodulator may demodulate modulated signals of the data stream and provide demodulated data to the receiver data processor. The receiver data processor may extract audio data from the demodulated data and provide the extracted audio data to the processor.

The processor may provide the audio data to the transcoder for transcoding. The decoder of the transcoder may decode the audio data from a first format into decoded audio data and the encoder may encode the decoded audio data into a second format. In some implementations, the encoder may encode the audio data using a higher data rate (e.g., upconvert) or a lower data rate (e.g., downconvert) than received from the wireless device. In other implementations the audio data may not be transcoded. Transcoding operations (e.g., decoding and encoding) may be performed by multiple components of the base station. For example, decoding may be performed by the receiver data processor and encoding may be performed by the transmission data processor. In other implementations, the processor may provide the audio data to the media gateway for conversion to another transmission protocol, coding scheme, or both. The media gateway may provide the converted data to another base station or core network via the network connection.

Although one or more of FIGS. 1-7 may illustrate systems, apparatuses, and/or methods according to the teachings of the disclosure, the disclosure is not limited to these illustrated systems, apparatuses, and/or methods. One or more functions or components of any of FIGS. 1-7 as illustrated or described herein may be combined with one or more other portions of another of FIGS. 1-7. For example, one or more elements of the method 600 of FIG. 6 may be performed in combination with other operations described herein. Accordingly, no single implementation described herein should be construed as limiting and implementations of the disclosure may be suitably combined without departing form the teachings of the disclosure. As an example, one or more operations described with reference to FIG. 6 may be optional, may be performed at least partially concurrently, and/or may be performed in a different order than shown or described.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A device comprising:
    one or more antennas configured to receive a first signal and a second signal from a second device, the first signal comprising a non-precoded signal; and
    a receiver coupled to the one or more antennas, the receiver configured to:
        determine a first channel estimate based on the first signal;

determine a second channel estimate based on the second signal;
determine an estimated distortion based at least in part on the first channel estimate and the second channel estimate; and
perform a distortion reduction operation on the second signal based on the estimated distortion to generate a reduced-distortion signal.

2. The device of claim 1, wherein the one or more antennas are configured to receive at least a portion of the first signal from each of multiple antennas of the second device.

3. The device of claim 1, wherein the first signal is based on one or more null data packets (NDPs).

4. The device of claim 1, wherein the first signal is based on a pilot sequence.

5. The device of claim 1, wherein the second signal is based on precoded data.

6. The device of claim 1, wherein the receiver is further configured to:
perform conditioning on the second signal and the second channel estimate based on the first channel estimate; and
determine a symbol estimate based on the conditioned second signal and the conditioned second channel estimate, wherein the estimated distortion is based on the symbol estimate.

7. The device of claim 6, wherein the receiver is further configured to perform the conditioning by modifying the second signal based on pre-whitening values, and wherein the pre-whitening values are based on the first channel estimate.

8. The device of claim 6, wherein the receiver is further configured to perform the conditioning by modifying the second signal based on an inverse matrix of the first channel estimate.

9. The device of claim 6, wherein the symbol estimate is based on a maximum likelihood estimate or a near maximum likelihood estimate.

10. The device of claim 9, wherein the symbol estimate comprises a hard-decision symbol estimate.

11. The device of claim 9, wherein the symbol estimate comprises a soft-decision symbol estimate.

12. The device of claim 1, further comprising a decoder configured to decode the reduced-distortion signal to generate received data.

13. The device of claim 1, wherein the receiver is integrated in a mobile device.

14. The device of claim 1, wherein the receiver is integrated in a base station or an access point.

15. A method of wireless communication, the method comprising:
receiving a first signal at a first device from a second device, the first signal comprising a non-precoded signal;
determining a first channel estimate based on the first signal;
receiving a second signal at the first device from the second device, the second signal received after receipt of the first signal;
determining a second channel estimate based on the second signal;
determining an estimated distortion based at least in part on the first channel estimate and the second channel estimate; and
performing a distortion reduction operation on the second signal based on the estimated distortion to generate a reduced-distortion signal.

16. The method of claim 15, wherein receiving the first signal comprises receiving, from each of a plurality of antennas of the first device, a corresponding null data packet (NDP).

17. The method of claim 16, wherein determining the first channel estimate comprises:
determining a first sub-channel estimate based on a first NDP received from a first antenna of the plurality of antennas;
determining a second sub-channel estimate based on a second NDP received from a second antenna of the plurality of antennas; and
determining the first channel estimate based on the first sub-channel estimate and the second sub-channel estimate.

18. The method of claim 15, further comprising:
determining a pre-whitening matrix based on the first channel estimate;
applying the pre-whitening matrix to the second signal and to the second channel estimate; and
after applying the pre-whitening matrix, determining a symbol estimate based on the second signal and the second channel estimate, wherein the estimated distortion is based on the symbol estimate.

19. The method of claim 18, wherein determining the pre-whitening matrix comprises:
estimating a thermal noise variance based on the first signal;
determining a distortion and thermal noise covariance matrix based on the first channel estimate and the thermal noise variance; and
determining the pre-whitening matrix based on the distortion and noise covariance matrix.

20. The method of claim 18, further comprising, after applying the pre-whitening matrix, performing multiple-input, multiple-output (MIMO) detection on the second signal and the second channel estimate, wherein the symbol estimate is based on the MIMO detection.

21. The method of claim 18, further comprising:
applying transmit chain processing to the symbol estimate to generate a processed symbol estimate; and
modifying the processed symbol estimate based on a power amplifier (PA) model to generate a modified symbol estimate, wherein the estimated distortion is based on the processed symbol estimate and the modified symbol estimate.

22. The method of claim 18, wherein the symbol estimate comprises a soft-decision symbol estimate.

23. The method of claim 22, wherein the soft-decision symbol estimate is determined based at least in part on a look-up table, a piecewise linear approximation, or both.

24. The method of claim 22, wherein the soft-decision symbol estimate is approximated based on an inverse of the first channel estimate.

25. The method of claim 22, further comprising applying a weighting value to the soft-decision symbol estimate to generate a weighted soft-decision symbol estimate, wherein the weighting value is based on a symbol variance associated with the soft-decision symbol estimate, and wherein the estimated distortion is based on the weighted soft-decision symbol estimate.

26. An apparatus comprising:

means for receiving a first signal and a second signal from a second device, the first signal comprising a non-precoded signal; and means for reducing distortion of the second signal based on an estimated distortion, the estimated distortion based at least in part on a first channel estimate and a second channel estimate, the first channel estimate based on the first signal, the second channel estimate based on the second signal.

27. The apparatus of claim 26, wherein the means for reducing distortion comprises means for determining a symbol estimate based at least in part on the first channel estimate and the second channel estimate, and wherein the estimated distortion is based on the symbol estimate.

28. The apparatus of claim 26, further comprising means for decoding the second signal after the distortion of the second signal is reduced.

29. A non-transitory, computer readable medium storing instructions that, when executed by a processor, cause the processor to perform operations comprising:

initiating receipt of a first signal at a first device from a second device, the first signal comprising a non-precoded signal;

determining a first channel estimate based on the first signal;

initiating receipt of a second signal at the first device from the second device, the second signal received after receipt of the first signal;

determining a second channel estimate based on the second signal;

determining an estimated distortion based at least in part on the first channel estimate and the second channel estimate; and initiating performance of a distortion reduction operation on the second signal based on the estimated distortion to generate a reduced-distortion signal.

30. The non-transitory, computer readable medium of claim 29, wherein at least a portion of the first signal is received from each antenna of the second device, and wherein the second signal comprises a multiple-input, multiple-output (MIMO) orthogonal frequency-division multiplexing (OFDM) signal.

* * * * *